(12) United States Patent
Sun et al.

(10) Patent No.: US 12,707,324 B2
(45) Date of Patent: Aug. 11, 2026

(54) COMMUNICATION METHOD AND APPARATUS, AND STORAGE MEDIUM

(71) Applicant: HUAWEI TECHNOLOGIES CO., LTD., Shenzhen (CN)

(72) Inventors: Fei Sun, Shanghai (CN); Yuanping Zhu, Shanghai (CN); Yulong Shi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 18/641,114

(22) Filed: Apr. 19, 2024

(65) Prior Publication Data

US 2024/0276291 A1 Aug. 15, 2024

Related U.S. Application Data

(63) Continuation of application No. PCT/CN2022/120864, filed on Sep. 23, 2022.

(30) Foreign Application Priority Data

Oct. 21, 2021 (CN) ........................ 202111229686.8

(51) Int. Cl.
*H04W 28/02* (2009.01)
*H04L 1/00* (2006.01)
*H04L 1/1607* (2023.01)

(52) U.S. Cl.
CPC ....... *H04W 28/0278* (2013.01); *H04L 1/0008* (2013.01); *H04L 1/1614* (2013.01)

(58) Field of Classification Search
None
See application file for complete search history.

(56) References Cited

U.S. PATENT DOCUMENTS

2022/0022093 A1* 1/2022 Liu .................. H04W 28/0278
2024/0015573 A1* 1/2024 Pradas ................. H04W 72/21

FOREIGN PATENT DOCUMENTS

| | | | |
|---|---|---|---|
| CN | 111314957 | A | 6/2020 |
| CN | 111757517 | A | 10/2020 |
| WO | 2020116820 | A1 | 6/2020 |

OTHER PUBLICATIONS

Ericsson, "LCG extension," 3GPP TSG-RAN WG2 Meeting #106, R2-1906995, XP51711292A, total 3 pages, 3rd Generation Partnership Project, Valbonne, France (May 13-17, 2019).
"3rd Generation Partnership Project; Technical Specification Group Radio Access Network; NR; Medium Access Control (MAC) protocol specification(Release 16)," 3GPP TS 38.321 V16.6.0, 158 pages, 3rd Generation Partnership Project, Valbonne, France (Sep. 2021).

* cited by examiner

*Primary Examiner* — Brian S Roberts
(74) *Attorney, Agent, or Firm* — Leydig, Voit & Mayer, Ltd.

(57) ABSTRACT

Embodiments of this application provide a communication method and apparatus, and a storage medium. The communication method includes: determining a target buffer status report (BSR) format based on a result of comparison between a first identifier and a first value, where the first identifier is a largest logical channel group (LCG) identifier in LCG identifiers of LCGs having buffered data; and generating a BSR based on the target BSR format. Uplink transmission resources can be properly used to report a BSR.

20 Claims, 11 Drawing Sheets

Communication apparatus

Network device

1101

Determine a target buffer status report BSR format based on a result of comparison between a quantity of LCGs configured for the communication apparatus and a first value

1102

Generate a BSR based on the target BSR format

1103

Send the BSR

COMMUNICATION METHOD AND APPARATUS, AND STORAGE MEDIUM

CROSS-REFERENCE TO RELATED APPLICATIONS

This application is a continuation of International Application No. PCT/CN2022/120864, filed on Sep. 23, 2022, which claims priority to Chinese Patent Application No. 202111229686.8, filed on Oct. 21, 2021. The disclosures of the aforementioned applications are hereby incorporated by reference in their entireties.

TECHNICAL FIELD

This application relates to the field of communication technologies, and in particular, to a communication method and apparatus, and a storage medium.

BACKGROUND

In a communication system, when a communication apparatus needs to transmit buffered data, the communication apparatus reports a buffer data volume of the communication apparatus to a base station by using a buffer status report (BSR), so that the base station allocates an uplink transmission resource to the communication apparatus based on the buffer data volume of the communication apparatus.

According to different services, the communication apparatus may establish a large quantity of radio bearers. If one BSR is reported for each logical channel (LCH), a large quantity of signaling overheads are caused. To reduce the overheads, the LCHs are combined and grouped, to form logical channel groups (LCGs), and each LCH correspondingly belongs to one LCG. The BSR is reported at a granularity of LCG. The buffer data volume of each LCG includes a total buffer data volume of all logical channels included in the LCG. A correspondence between an LCG and an LCH of the communication apparatus is configured by a base station. In a long term evolution (LTE) communication system, a quantity of LCGs is defined as 4, and in a new radio (NR) communication system, a quantity of LCGs is extended to 8.

With development of the communication system, a quantity of LCGs increases, and a quantity of LCGs that need to be reported by a communication apparatus increases. Therefore, how to properly report a BSR is an urgent problem to be resolved.

SUMMARY

Embodiments of this application provide a communication method and apparatus, and a storage medium, to properly report a BSR.

According to a first aspect, an embodiment of this application provides a communication method. The communication method includes: determining a target buffer status report BSR format based on a result of comparison between a first identifier and a first value, where the first identifier is a largest LCG identifier in LCG identifiers of logical channel groups LCGs having buffered data; and generating a BSR based on the target BSR format.

In this embodiment of this application, a communication apparatus may determine, based on the result of comparison between the first identifier and the first value, a proper BSR format for reporting the BSR, so that an uplink transmission resource can be properly used to report the BSR, to implement refined scheduling of a network resource.

In a possible implementation of the first aspect, the determining a target BSR format based on a result of comparison between a first identifier and a first value includes: when the first identifier is greater than the first value, determining a first format as the target BSR format, where a BSR in the first format is used to report a buffer data volume of an LCG whose LCG identifier is within a first identifier threshold; or when the first identifier is less than or equal to the first value, determining a second format as the target BSR format, where a BSR in the second format is used to report a buffer data volume of an LCG whose LCG identifier is within a second identifier threshold, and the first identifier threshold is greater than the second identifier threshold.

In this implementation, when a same quantity of LCGs are reported, a quantity of bits of the BSR in the first format is greater than that of the BSR in the second format, and the BSR in the second format cannot report an LCG whose LCG identifier is greater than the first value. When the first identifier is greater than the first value, the first format is determined as the target BSR format. When the first identifier is less than or equal to the first value, the second format is determined as the target BSR format. While integrity of a reported LCG having buffered data is ensured, a quantity of bits required for reporting a BSR is reduced, and resource utilization is improved.

In a possible implementation of the first aspect, when the quantity of LCGs having buffered data is 1, the first format or the second format is a short BSR format; when the quantity of LCGs having buffered data is greater than 1 and less than a second value, the first format or the second format is a medium BSR format; or when the quantity of LCGs having buffered data is greater than or equal to the second value, the first format or the second format is a long BSR format.

In this implementation, a specific format of the first format or the second format is determined based on the quantity of LCGs having buffered data. The short BSR format is used to report a buffer data volume of one LCG. The long BSR format and the medium BSR format may report buffer data volumes of one or more LCGs. A quantity of bits in the short BSR format is less than those in the long BSR format and the medium BSR format. When a quantity of LCGs reported by using a BSR is greater than 1 and less than the second value, a quantity of bits of a BSR in the medium BSR format is less than a quantity of bits of a BSR in the long BSR format when a same quantity of LCGs are reported. When a quantity of LCGs reported by using a BSR is greater than or equal to the second value, a quantity of bits of a BSR in the medium BSR format is greater than or equal to a quantity of bits of a BSR in the long BSR format when a same quantity of LCGs are reported. When the quantity of LCGs having buffered data is 1, the first format or the second format is the short BSR format. When the quantity of LCGs having buffered data is greater than 1 and less than the second value, the first format or the second format is the medium BSR format. When the quantity of LCGs having buffered data is greater than or equal to the second value, the first format or the second format is the long BSR format. While integrity of a reported LCG is ensured, a quantity of bits required for reporting a BSR is reduced, and resource utilization is improved.

In a possible implementation of the first aspect, a BSR in the long BSR format includes a first bitmap, and each bit in the first bitmap indicates whether each of at least one LCG has buffered data, or indicates whether a buffer size BS field corresponding to each of the at least one LCG exists.

In this implementation, the bitmap indicates whether each of the at least one LCG has buffered data, or indicates whether the buffer size BS field corresponding to each of the at least one LCG exists, and an identifier of the LCG does not need to be reported. When a quantity of reported LCGs is greater than or equal to the second value, a quantity of bits required for reporting a BSR is reduced, and less data is wasted.

In a possible implementation of the first aspect, a BSR in the medium BSR format includes an LCG identifier of at least one LCG and indication information that indicates a buffer data volume of the at least one LCG.

In this implementation, when a quantity of reported LCGs is less than the second value, the BSR is reported by using the medium BSR format, so that a quantity of bits required for reporting the BSR is reduced, and resource utilization is improved.

In a possible implementation of the first aspect, a BSR in the short BSR format includes an LCG identifier of a first LCG and indication information that indicates a buffer data volume of the first LCG.

In this implementation, when a quantity of LCGs that need to be reported is 1, the BSR is reported by using the short BSR format, so that an uplink transmission resource can be properly used, and a waste of data can be reduced.

In a possible implementation of the first aspect, the determining a target BSR format based on a result of comparison between a first identifier and a first value includes: determining the target BSR format based on the result of comparison between the first identifier and the first value and a result of comparison between a quantity of padding bits and a third value.

In this implementation, the target BSR format is determined based on the result of comparison between the first identifier and the first value and the result of comparison between the quantity of padding bits and the third value, to select a proper BSR format to report a buffer data volume of an LCG having buffered data. In this way, an uplink resource can be properly used to report a BSR, and refined scheduling of a network resource is implemented.

In a possible implementation of the first aspect, the determining the target BSR format based on the result of comparison between the first identifier and the first value and the result of comparison between the quantity of padding bits and the third value includes: when the first identifier is greater than the first value and the quantity of padding bits is greater than or equal to the third value, determining a first format as the target BSR format; when the first identifier is greater than the first value and the quantity of padding bits is less than the third value, determining a second format as the target BSR format, where a BSR in the second format is used to report a buffer data volume of an LCG whose LCG identifier is less than the first value in the LCGs having buffered data; or when the first identifier is less than or equal to the first value, determining the second format as the target BSR format.

In this implementation, the BSR in the first format and the BSR in the second format can report LCGs within different LCG identifier thresholds, and occupy different quantities of bits. A proper BSR format is determined from the first format and the second format based on the result of comparison between the first identifier and the first value and the quantity of padding bits, and the BSR is reported by using the BSR format, to ensure integrity of the reported LCG.

In a possible implementation of the first aspect, when the quantity of padding bits is equal to the third value, the first format is a short BSR format; when the quantity of padding bits is greater than the third value and less than a fourth value, the first format is a medium BSR format; or when the quantity of padding bits is greater than or equal to the fourth value, the first format is a long BSR format.

In this implementation, a specific format of the first format is determined based on the quantity of padding bits. When the quantity of padding bits is equal to the third value, the first format is the short BSR format. When the quantity of padding bits is greater than the third value and less than the fourth value, the first format is the medium BSR format. When the quantity of padding bits is greater than or equal to the fourth value, the first format is the long BSR format. This ensures that the quantity of padding bits is greater than or equal to a size of a BSR in the first format plus a size of a MAC subheader of the BSR in the first format, to reduce cases in which a BSR cannot be reported because a quantity of bits of the generated BSR is greater than the quantity of padding bits.

In a possible implementation of the first aspect, the third value is determined based on a size of a BSR in the first format and a size of a media access control MAC subheader of the BSR in the first format.

In this implementation, the third value may be specifically a quantity of bits occupied when the BSR in the first format reports a buffer data volume of one LCG plus a quantity of bits occupied by the MAC subheader in the first format. That is, the third value is a smallest quantity of bits required for sending the BSR in the first format by the communication apparatus. When the quantity of padding bits is greater than the third value, the first format is determined as the target BSR format, to ensure that the padding bits are sufficient to report the generated BSR in the first format.

In a possible implementation of the first aspect, the determining a target BSR format based on a result of comparison between a first identifier and a first value includes: determining the target BSR format based on the result of comparison between the first identifier and the first value and a quantity of LCGs having buffered data.

In this implementation, the target BSR format is determined based on the result of the comparison between the first identifier and the first value and the quantity of LCGs having buffered data, to select a proper BSR format to report a buffer data volume of an LCG having buffered data. In this way, an uplink resource can be properly used to report a BSR, and refined scheduling of a network resource is implemented.

In a possible implementation of the first aspect, the determining the target BSR format based on the result of comparison between the first identifier and the first value and a quantity of LCGs having buffered data includes: when the first identifier is greater than the first value and the quantity of LCGs having buffered data is 1, determining a first short BSR format as the target BSR format; when the first identifier is greater than the first value and the quantity of LCGs having buffered data is greater than 1 and less than a second value, determining a medium BSR format as the target BSR format; when the first identifier is greater than the first value and the quantity of LCGs having buffered data is greater than or equal to the second value, determining a first long BSR format as the target BSR format; when the first identifier is less than or equal to the first value and the quantity of LCGs having buffered data is 1, determining a second short BSR format as the target BSR format; or when the first identifier is less than or equal to the first value and the quantity of LCGs having buffered data is greater than 1, determining a second long BSR format as the target BSR format.

In this implementation, a proper BSR format is determined from the first long BSR format, the first short BSR format, the medium BSR format, the second long BSR format, and the second short BSR format based on the result of comparison between the first identifier and the first value and the quantity of LCGs having buffered data, and a BSR is reported by using the BSR format. This ensures integrity of a reported LCG, reduces a quantity of bits required for reporting the BSR, and improves resource utilization.

In a possible implementation of the first aspect, the determining a target BSR format based on a result of comparison between a first identifier and a first value includes: determining the target BSR format based on the result of comparison between the first identifier and the first value, a quantity of LCGs having buffered data, and a quantity of padding bits.

In this implementation, the target BSR format is determined based on the result of comparison between the first identifier and the first value, the quantity of LCGs having buffered data, and a result of comparison between the quantity of padding bits and a third value, to select a proper BSR format to report a buffer data volume of an LCG having buffered data. In this way, an uplink resource can be properly used to report a BSR, and refined scheduling of a network resource is implemented.

In a possible implementation of the first aspect, the determining the target BSR format based on the result of comparison between the first identifier and the first value, a quantity of LCGs having buffered data, and a quantity of padding bits includes: when the first identifier is greater than the first value, the quantity of LCGs having buffered data is 1, and the quantity of padding bits is greater than or equal to the third value, determining a first short BSR format as the target BSR format; when the first identifier is greater than the first value, the quantity of LCGs having buffered data is greater than 1, and the quantity of padding bits is equal to the third value, determining the first short BSR format as the target BSR format; when the first identifier is greater than the first value, the quantity of LCGs having buffered data is greater than 1, and the quantity of padding bits is less than the third value, determining a second short BSR format as the target BSR format, where a BSR in the second short BSR format is used to report a buffer data volume of an LCG whose LCG identifier is less than the first value in the LCGs having buffered data; when the first identifier is greater than the first value, the quantity of LCGs having buffered data is greater than 1, and the quantity of padding bits is greater than the third value and less than a fourth value, determining a medium BSR format as the target BSR format; when the first identifier is greater than the first value, the quantity of LCGs having buffered data is greater than 1 and less than a second value, and the quantity of padding bits is greater than the fourth value, determining the medium BSR format as the target BSR format; when the first identifier is greater than the first value, the quantity of LCGs having buffered data is greater than or equal to the second value, and the quantity of padding bits is greater than the fourth value, determining a first long BSR format as the target BSR format; when the first identifier is less than or equal to the first value and the quantity of LCGs having buffered data is 1, determining the second short BSR format as the target BSR format; when the first identifier is less than or equal to the first value, the quantity of LCGs having buffered data is greater than 1, and the quantity of padding bits is equal to a fifth value, determining the second short BSR format as the target BSR format; or when the first identifier is less than or equal to the first value, the quantity of LCGs having buffered data is greater than 1, and the quantity of padding bits is greater than the fifth value, determining a second long BSR format as the target BSR format.

In this implementation, a proper BSR format is determined from the first long BSR format, the first short BSR format, the medium BSR format, the second long BSR format, and the second short BSR format based on the result of comparison between the first identifier and the first value, the quantity of LCGs having buffered data, and the quantity of padding bits, and a BSR is reported by using the BSR format. This ensures integrity of a reported LCG, reduces a quantity of bits required for reporting the BSR, and improves resource utilization.

In a possible implementation of the first aspect, the fifth value is determined based on a size of a BSR in the second short BSR format and a size of a MAC subheader corresponding to the second short BSR format.

In a possible implementation of the first aspect, the first value is 7.

According to a second aspect, an embodiment of this application provides a communication method, including: determining a target buffer status report BSR format based on a result of comparison between a second identifier and a first value, where the second identifier is a largest LCG identifier in LCG identifiers of LCGs configured for a communication apparatus; and generating a BSR based on the target BSR format.

In this embodiment of this application, one BSR format is determined as the target BSR format based on the LCG identifier of the LCG configured for the communication apparatus, and the BSR is reported in the target BSR format. The target BSR format is determined based on a configuration status of the communication apparatus, so that a format used by the communication apparatus to report the BSR matches configuration information of the communication apparatus, and the BSR can be properly reported.

In a possible implementation of the second aspect, the determining a target buffer status report BSR format based on a result of comparison between a second identifier and a first value includes: when the second identifier is greater than the first value, determining a first format as the target BSR format, where a BSR in the first format is used to report a buffer data volume of an LCG whose LCG identifier is within a first identifier threshold; or when the second identifier is less than or equal to the first value, determining a second format as the target BSR format, where a BSR in the second format is used to report a buffer data volume of an LCG whose LCG identifier is within a second identifier threshold, and the first identifier threshold is greater than the second identifier threshold.

In this implementation, when a same quantity of LCGs are reported, a quantity of bits of the BSR in the first format is greater than that of the BSR in the second format, and the BSR in the second format cannot report an LCG whose LCG identifier is greater than the first value. When the second identifier is greater than the first value, the first format is determined as the target BSR format. When the second identifier is less than or equal to the first value, the second format is determined as the target BSR format. While integrity of a reported LCG having buffered data is ensured, a quantity of bits required for reporting a BSR is reduced, and resource utilization is improved.

According to a third aspect, an embodiment of this application provides a communication method, including:

determining a target BSR format based on a quantity of LCGs configured for a communication apparatus; and generating a BSR based on the target BSR format.

In this embodiment of this application, one BSR format is determined as the target BSR format based on the quantity of LCGs configured for the communication apparatus, and the BSR is reported in the target BSR format. The target BSR format is determined based on a configuration status of the communication apparatus, so that a format used by the communication apparatus to report the BSR matches configuration information of the communication apparatus, and the BSR can be properly reported.

In a possible implementation of the third aspect, the determining a target BSR format based on a quantity of LCGs configured for a communication apparatus includes: when the quantity of LCGs is greater than a first value, determining a first format as the target BSR format, where a BSR in the first format is used to report a buffer data volume of an LCG whose LCG identifier is within a first identifier threshold; or when the quantity of LCGs is less than or equal to the first value, determining a second format as the target BSR format, where a BSR in the second format is used to report a buffer data volume of an LCG whose LCG identifier is within a second identifier threshold, and the first identifier threshold is greater than the second identifier threshold.

In this implementation, when a same quantity of LCGs are reported, a quantity of bits of the BSR in the first format is greater than that of the BSR in the second format, and the BSR in the second format cannot report an LCG whose LCG identifier is greater than the first value. When the quantity of LCGs configured for the communication apparatus is greater than the first value, the first format is determined as the target BSR format. When the quantity of LCGs configured for the communication apparatus is less than or equal to the first value, the second format is determined as the target BSR format. While integrity of a reported LCG having buffered data is ensured, a quantity of bits required for reporting a BSR is reduced, and resource utilization is improved.

According to a fourth aspect, an embodiment of this application provides a communication apparatus, including:

a processing module, configured to determine a target buffer status report BSR format based on a result of comparison between a first identifier and a first value, where the first identifier is a largest LCG identifier in LCG identifiers of logical channel groups LCGs having buffered data, where the processing module is further configured to generate a BSR based on the target BSR format; and a transceiver module, configured to send the BSR to a network device.

In a possible implementation of the fourth aspect, the processing module is specifically configured to: when the first identifier is greater than the first value, determine a first format as the target BSR format, where a BSR in the first format is used to report a buffer data volume of an LCG whose LCG identifier is within a first identifier threshold; or when the first identifier is less than or equal to the first value, determine a second format as the target BSR format, where a BSR in the second format is used to report a buffer data volume of an LCG whose LCG identifier is within a second identifier threshold, and the first identifier threshold is greater than the second identifier threshold.

In a possible implementation of the fourth aspect, when the quantity of LCGs having buffered data is 1, the first format or the second format is a short BSR format; when the quantity of LCGs having buffered data is greater than 1 and less than a second value, the first format or the second format is a medium BSR format; or when the quantity of LCGs having buffered data is greater than or equal to the second value, the first format or the second format is a long BSR format.

In a possible implementation of the fourth aspect, a BSR in the long BSR format includes a first bitmap, and each bit in the first bitmap indicates whether each of at least one LCG has buffered data, or indicates whether a buffer size BS field corresponding to each of the at least one LCG exists.

In a possible implementation of the fourth aspect, a BSR in the medium BSR format includes an LCG identifier of at least one LCG and indication information that indicates a buffer data volume of the at least one LCG.

In a possible implementation of the fourth aspect, a BSR in the short BSR format includes an LCG identifier of a first LCG and indication information that indicates a buffer data volume of the first LCG.

In a possible implementation of the fourth aspect, the processing module is specifically configured to determine the target BSR format based on the result of comparison between the first identifier and the first value and a result of comparison between a quantity of padding bits and a third value.

In a possible implementation of the fourth aspect, the processing module is specifically configured to: when the first identifier is greater than the first value and the quantity of padding bits is greater than or equal to the third value, determine a first format as the target BSR format; when the first identifier is greater than the first value and the quantity of padding bits is less than the third value, determine a second format as the target BSR format, where a BSR in the second format is used to report a buffer data volume of an LCG whose LCG identifier is less than the first value in the LCGs having buffered data; or when the first identifier is less than or equal to the first value, determine the second format as the target BSR format.

In a possible implementation of the fourth aspect, when the quantity of padding bits is equal to the third value, the first format is a short BSR format; when the quantity of padding bits is greater than the third value and less than a fourth value, the first format is a medium BSR format; or when the quantity of padding bits is greater than or equal to the fourth value, the first format is a long BSR format.

In a possible implementation of the fourth aspect, the third value is determined based on a size of a BSR in the first format and a size of a media access control MAC subheader of the BSR in the first format.

In a possible implementation of the fourth aspect, the processing module is specifically configured to determine the target BSR format based on the result of comparison between the first identifier and the first value and a quantity of LCGs having buffered data.

In a possible implementation of the fourth aspect, the processing module is specifically configured to: when the first identifier is greater than the first value and the quantity of LCGs having buffered data is 1, determine a first short BSR format as the target BSR format; when the first identifier is greater than the first value and the quantity of LCGs having buffered data is greater than 1 and less than a second value, determine a medium BSR format as the target BSR format; when the first identifier is greater than the first value and the quantity of LCGs having buffered data is greater than or equal to the second value, determine a first long BSR format as the target BSR format; when the first identifier is less than or equal to the first value and the quantity of LCGs having buffered data is 1, determine a second short BSR format as the target BSR format; or when the first identifier is less than or equal to the first value and the quantity of LCGs having buffered data is greater than 1, determine a second long BSR format as the target BSR format.

In a possible implementation of the fourth aspect, the processing module is specifically configured to determine the target BSR format based on the result of comparison between the first identifier and the first value, a quantity of LCGs having buffered data, and a quantity of padding bits.

In a possible implementation of the fourth aspect, the processing module is specifically configured to: when the first identifier is greater than the first value, the quantity of LCGs having buffered data is 1, and the quantity of padding bits is greater than or equal to a third value, determine a first short BSR format as the target BSR format; when the first identifier is greater than the first value, the quantity of LCGs having buffered data is greater than 1, and the quantity of padding bits is equal to the third value, determine the first short BSR format as the target BSR format; when the first identifier is greater than the first value, the quantity of LCGs having buffered data is greater than 1, and the quantity of padding bits is less than the third value, determine a second short BSR format as the target BSR format, where a BSR in the second short BSR format is used to report a buffer data volume of an LCG whose LCG identifier is less than the first value in the LCGs having buffered data; when the first identifier is greater than the first value, the quantity of LCGs having buffered data is greater than 1, and the quantity of padding bits is greater than the third value and less than a fourth value, determine a medium BSR format as the target BSR format; when the first identifier is greater than the first value, the quantity of LCGs having buffered data is greater than 1 and less than a second value, and the quantity of padding bits is greater than the fourth value, determine the medium BSR format as the target BSR format; when the first identifier is greater than the first value, the quantity of LCGs having buffered data is greater than or equal to the second value, and the quantity of padding bits is greater than the fourth value, determine a first long BSR format as the target BSR format; when the first identifier is less than or equal to the first value and the quantity of LCGs having buffered data is 1, determine the second short BSR format as the target BSR format; when the first identifier is less than or equal to the first value, the quantity of LCGs having buffered data is greater than 1, and the quantity of padding bits is equal to a fifth value, determine the second short BSR format as the target BSR format; or when the first identifier is less than or equal to the first value, the quantity of LCGs having buffered data is greater than 1, and the quantity of padding bits is greater than the fifth value, determine a second long BSR format as the target BSR format.

In a possible implementation of the fourth aspect, the fifth value is determined based on a size of a BSR in the second short BSR format and a size of a MAC subheader corresponding to the second short BSR format.

In a possible implementation of the fourth aspect, the first value is 7.

For technical effects brought by the fourth aspect or the possible implementations of the fourth aspect, refer to the descriptions of the technical effects brought by the first aspect or the possible implementations of the first aspect.

According to a fifth aspect, an embodiment of this application provides a communication apparatus. The communication apparatus includes a processor and a memory. The memory stores a computer program. When the processor executes the computer program, a computing device performs the method according to any possible implementation of the first aspect, the second aspect, or the third aspect.

According to a sixth aspect, an embodiment of this application provides a communication apparatus. The communication apparatus includes a logic circuit and an interface, and the logic circuit is coupled to the interface. The interface is configured to input to-be-processed data, the logic circuit processes the to-be-processed data according to the method described in any possible implementation of the first aspect, the second aspect, or the third aspect, to obtain processed data. The interface is configured to output the processed data.

According to a seventh aspect, an embodiment of this application provides a computer-readable storage medium. The computer-readable storage medium stores instructions, and when the instructions are run on at least one processor, the method described in any possible implementation of the first aspect, the second aspect, or the third aspect is implemented.

According to an eighth aspect, this application provides a computer program product. The computer program product includes a computer program or computer code. When the computer program product runs on a computer, the method in the first aspect or any possible implementation of the first aspect is performed, or the method in the second aspect or any possible implementation of the second aspect is performed, or the method in the third aspect or any possible implementation of the third aspect is performed.

BRIEF DESCRIPTION OF DRAWINGS

To describe the technical solutions in embodiments of this application more clearly, the following briefly describes the accompanying drawings in embodiments of this application. It is clear that the accompanying drawings in the following descriptions show merely some embodiments of this application, and a person of ordinary skill in the art may derive other drawings from these accompanying drawings without creative efforts.

DESCRIPTION OF EMBODIMENTS

Figure 1:
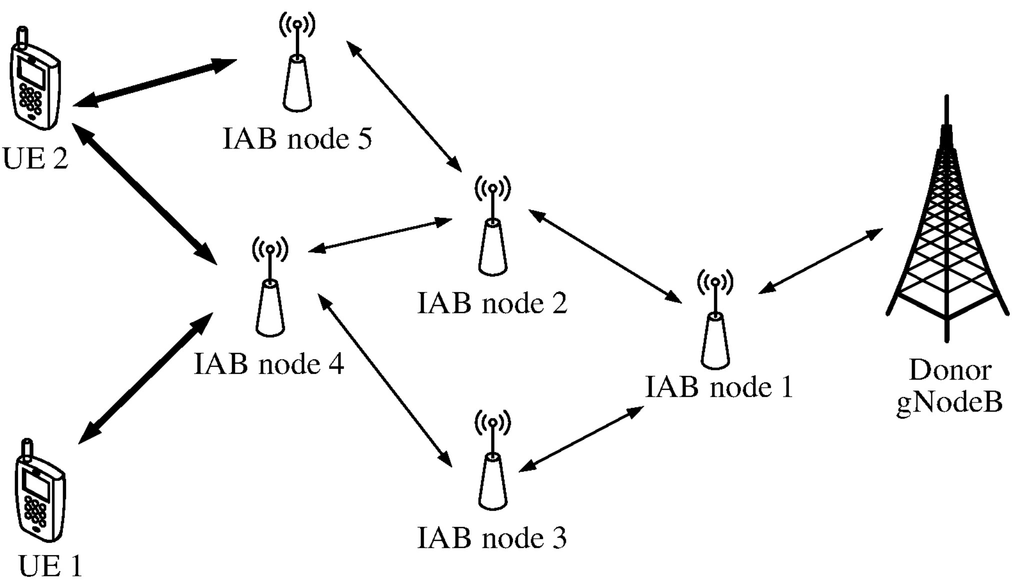
FIG. 1 is a schematic diagram of a structure of an IAB system according to an embodiment of this application.

In the specification, claims, and accompanying drawings of this application, the terms "first", "second", and the like are merely intended to distinguish between different objects, but are not intended to limit sequences, time sequences, priorities, or importance degrees of a plurality of objects. In embodiments of this application, "a plurality of" means two or more than two. In addition, terms such as "include" and "have" and any other variants thereof are intended to cover a non-exclusive inclusion. For example, processes, methods, systems, products, or devices that include a series of steps or units are not limited to listed steps or units, but instead, optionally further include steps or units that are not listed, or optionally further include other steps or units inherent to these processes, methods, products, or devices. In addition, the character "/" generally indicates an "or" relationship between the associated objects.

"Embodiments" mentioned herein mean that specific features, structures, or characteristics described in combination with the embodiments may be included in at least one embodiment of this application. The phrase shown in various locations in the specification may not necessarily refer to a same embodiment, and is not an independent or optional embodiment exclusive from another embodiment. It may be understood explicitly and implicitly by a person skilled in the art that the embodiments described herein may be combined with other embodiments.

Technical solutions in embodiments of this application may be applied to various communication systems, for example, a long term evolution (LTE) system, a universal mobile telecommunications system (UMTS), a fifth generation (5G) system, a new radio (NR) system, and another new system emerging with development of technologies. The following uses an integrated access and backhaul (IAB) network scenario in NR as an example to describe an application scenario of the technical solutions in embodiments of this application.

Compared with the fourth generation mobile communication system, the fifth generation mobile communication (5G) imposes stricter requirements on network performance indicators, for example, a capacity increased by 1000 times, wider coverage, ultra-high reliability, and an ultra-low latency. In an aspect, considering that high-frequency carrier frequency resources are abundant, high-frequency small cell networking becomes more and more popular in hotspot areas to meet ultra-high capacity requirements of 5G. High-frequency carriers have poor propagation characteristics, severe attenuation due to blocking, and a small coverage area. Therefore, a large quantity of small cells need to be deployed intensively. Correspondingly, providing fiber backhaul for these small cells needs high costs and has great difficulty in construction. Therefore, an economical and convenient backhaul solution is needed. In another aspect, from the perspective of wide coverage requirements, to provide network coverage in some remote areas, fiber deployment is difficult and needs high costs. Therefore, a flexible and convenient access and backhaul solution needs to be designed. The IAB technology provides ideas to resolve the two problems: using a wireless transmission solution for both an access link and a backhaul link. This reduces optical fiber deployment.

FIG. 1 is an example of a structure of an IAB system according to an embodiment of this application. In an IAB network, a relay node RN (Relay Node), or referred to as an IAB node, may provide a radio access service for user equipment (UE). Service data of the UE is transmitted by the IAB node by connecting to an IAB donor through a wireless backhaul link. In this application, the IAB donor may also be referred to as a donor node or a donor gNodeB (DgNB). The IAB node may include a mobile terminal (MT) part and a distributed unit (DU) part. When facing a parent node of the IAB node, the IAB node may serve as a terminal device, that is, a role of the MT. When facing a child node (the child node may be another IAB node or common UE) of the IAB node, the IAB node is considered as a network device, that is, a role of the DU. The donor gNodeB DgNB may be an access network element having a complete base station function, or may be an access network element in a form of separation of a central unit (CU) and a distributed unit (DU). The donor gNodeB is connected to a core network (for example, connected to a 5G core network 5GC) network element that serves the UE, and provides a radio backhaul function for the IAB node. For ease of description, a central unit of the donor node is briefly referred to as a donor CU (or directly referred to as a CU), and a distributed unit of the donor node is briefly referred to as a donor DU. The donor CU may alternatively be in a form in which a control plane (CP) and a user plane (UP) are separated. For example, the CU may include one CU-CP and one CU-UP (or more CU-UPs).

FIG. 1 uses two UEs and five IAB nodes as an example. The two UEs are UE 1 and UE 2, and the five IAB nodes are an IAB node 1 to an IAB node 5. It should be understood that, in FIG. 1, a thick line represents an access link, and a thin line represents a backhaul link. The UE 2 may be connected to the donor gNodeB through the IAB node 5, the IAB node 2, and the IAB node 1. The UE 2 may alternatively be connected to a donor gNodeB through the IAB node 4, the IAB node 2, and the IAB node 1. Alternatively, the UE 2 may be connected to the donor gNodeB through the IAB node 4, the IAB node 3, and the IAB node 1. The UE 1 may be connected to the donor gNodeB through the IAB node 4, the IAB node 3, and the IAB node 1. The UE 1 may be connected to the donor gNodeB through the IAB node 4, the IAB node 2, and the IAB node 1.

It should be noted that the communication system shown in FIG. 1 is merely an example, and does not constitute a limitation on an application scenario to which embodiments of this application are applicable. It should be understood that the IAB node used in embodiments of this application is merely for description, and does not indicate that the solutions in embodiments of this application are used only in an NR scenario.

In an IAB network, one or more IAB nodes may be included on a transmission path between UE and an IAB donor. Each IAB node needs to maintain a wireless backhaul link to a parent node, and further needs to maintain a wireless link to a child node. If the child node of the IAB node is UE, a wireless access link exists between the IAB node and the child node (namely, the UE) of the IAB node. If the child node of the IAB node is another IAB node, a wireless backhaul link exists between the IAB node and the child node (namely, the another IAB node). Refer to FIG. 1. In a path "UE 1→IAB node 4→IAB node 3→IAB node 1→IAB donor", the UE 1 accesses the IAB node 4 through a wireless access link, the IAB node 4 is connected to the IAB node 3 through a wireless backhaul link, the IAB node 3 is connected to the IAB node 1 through a wireless backhaul link, and the IAB node 1 is connected to the IAB donor node through a wireless backhaul link.

Figure 2:
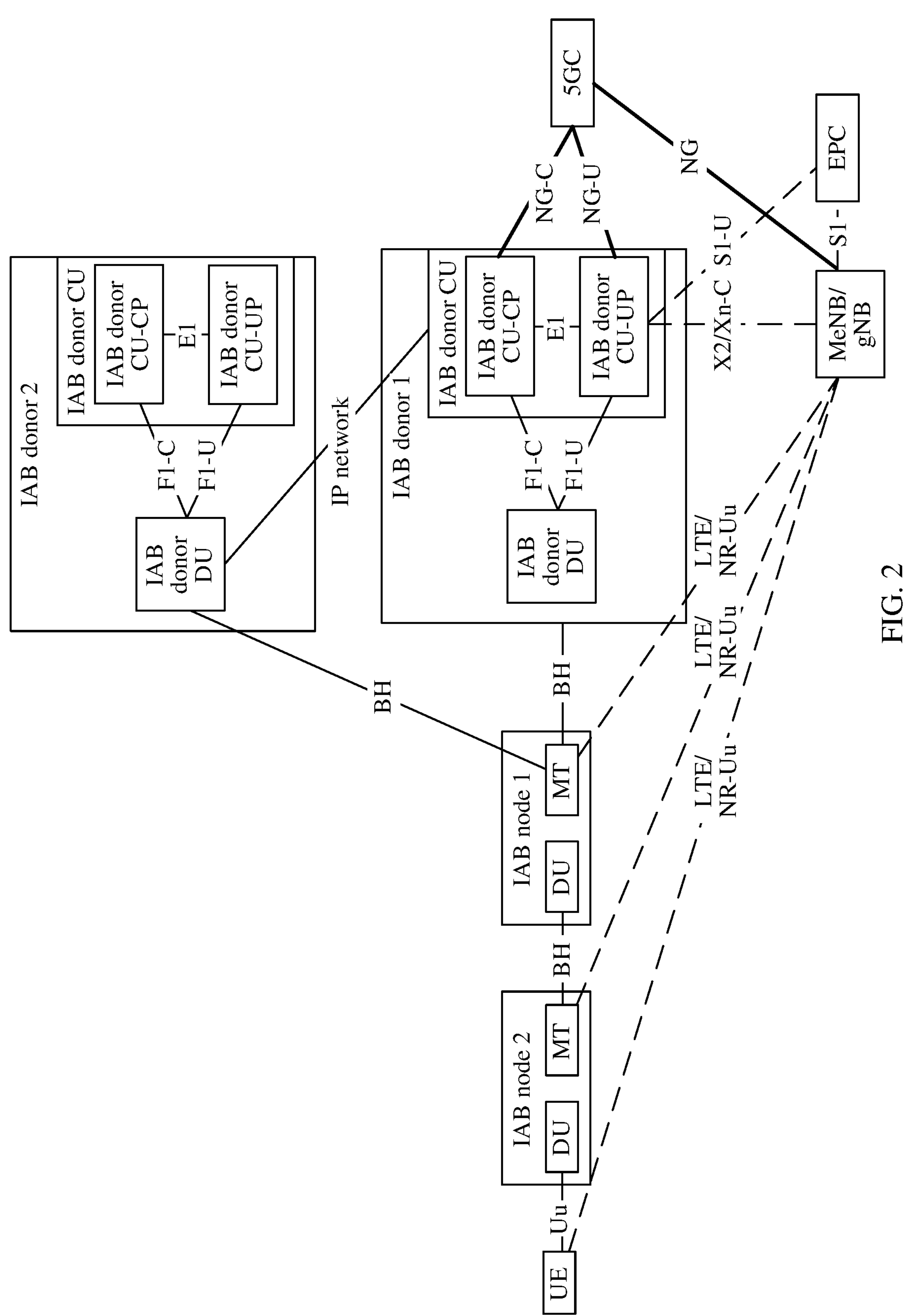
FIG. 2 is a diagram of an IAB network architecture according to an embodiment of this application.

The BSR reporting method provided in embodiments of this application may be applied to an IAB network, including a standalone (SA) IAB network and a non-standalone (NSA) IAB network. The IAB node includes an MT part and a DU part. The IAB donor may be divided into a DU part and a CU part, and the CU may be further divided into a CU-CP part and a CU-UP part. FIG. 2 is an example of a diagram of an IAB network architecture according to an embodiment of this application. FIG. 2 shows an example in which an IAB node is connected to an IAB donor through a wireless backhaul link. FIG. 2 uses an example in which one UE, two IAB nodes, and two IAB donors are included. The two IAB nodes are an IAB node 1 and an IAB node 2, and each includes an MT part and a DU part. The two IAB donors are an IAB donor 1 and an IAB donor 2. The two IAB donors are the IAB donor 1 and the IAB donor 2. Each IAB donor may be further divided into a DU part and a CU part, and the CU may be further divided into a CU-CP part and a CU-UP part. In FIG. 2, communication between an MT of the IAB node 2 and a DU of the IAB node 1, communication between an MT of the IAB node 1 and a DU of the IAB donor 1, and communication between the MT of the IAB node 1 and a DU of the IAB donor 2 are all performed through a wireless backhaul (BH) link. A Uu interface is established between the UE and an IAB2-DU. An F1-C interface is established between an IAB donor DU and an IAB donor CU-CP, an F1-U interface is established between the IAB donor DU and the IAB donor CU-UP, and the DU of the IAB donor 2 is connected to a CU of the IAB donor 1 over an IP network.

There is an F1 interface between a DU of each IAB node and a CU of an IAB donor. The F1 interface may include two parts: a control plane and a user plane. The user plane part is maintained between the IAB-DU and the IAB donor CU-UP, and the control plane part is maintained between the IAB-DU and the IAB donor CU-CP. The F1 interface between the IAB-DU and the IAB donor CU is not shown in FIG. 2. It is clear that the F1 interface may also be referred to as an F1* interface. A name of the interface is not limited in embodiments of this application. In this document, the interface is referred to as the F1 interface.

The F1 interface may support a user plane protocol (F1-U/F1*-U) and a control plane protocol (F1-C/F1*-C). The user plane protocol includes one or more of the following protocol layers: a general packet radio service (GPRS) tunneling protocol user plane (GTP-U) protocol layer, a user datagram protocol (UDP) protocol layer, an internet protocol (IP) protocol layer, and the like. The control plane protocol includes one or more of the following protocol layers: an F1 application protocol (F1AP), a stream control transport protocol (SCTP), an IP protocol layer, and the like. The IAB node and the IAB donor may perform interface management, manage the IAB-DU, perform UE context-related configuration, and the like through the control plane of the F1/F1* interface. Functions such as user plane data transmission and downlink transmission status feedback may be performed between the IAB node and the IAB donor through the user plane of the F1/F1* interface.

When an IAB node works in the SA mode, the IAB node may establish single connectivity to one parent node, or may establish dual connectivity to two parent nodes. The two parent nodes may be controlled by a same IAB donor, or may be controlled by different IAB donors. An F1 interface needs to be established between a DU part of the IAB node and an IAB donor, and the IAB donor may be connected to a 5G core network, that is, thick lines in FIG. 2. The IAB-donor-CU-CP is connected to a control plane network element (for example, an access and mobility management function) in the 5GC through an NG control plane interface (NG-C), and the IAB-donor-CU-UP is connected to a user plane network element (for example, a user plane function) in the 5GC through an NG user plane interface (NG-U).

When the IAB node works in the NSA mode, the IAB-donor-CU-UP may be connected to an EPC (for example, connected to a serving gateway (SGW)) through an S1 user plane interface (S1-U), an LTE Uu air interface connection exists between a MeNB and an MT of the IAB node, an X2-C interface exists between the MeNB and the IAB-donor-CU-CP, and the MeNB is connected to an EPC through an S1 interface (including an S1 user plane interface and an S1 interface control plane), that is, dashed lines in FIG. 2.

In another possible case, the MeNB in FIG. 2 may also be replaced with a 5G base station gNB. The LTE-Uu interface in FIG. 2 is correspondingly replaced with an NR-Uu interface. A user plane interface and/or a control plane interface may be established between the gNB and the 5GC. The gNB and the IAB-donor provide a dual connectivity service for the IAB node. The gNB may serve as a master base station of the IAB node or a secondary base station of the IAB node.

The foregoing is an example of an application scenario of the technical solutions in embodiments of this application. It should be understood that the technical solutions in embodiments of this application are not limited to being applied only to the network architecture shown in FIG. 2.

In embodiments of this application, the terminal device may be referred to as user equipment (UE), a terminal device, a terminal, a mobile station (MS), a mobile terminal (MT), or the like. For example, the terminal device may include a handheld device having a wireless connection function or a communication device connected to a wireless modem. The terminal device may communicate with a core network through a radio access network (RAN), and exchange a voice and/or data with the RAN. The terminal device may be referred to as an access terminal, a terminal, a subscriber unit, a subscriber station, a mobile station, a remote station, a remote terminal, a mobile device, a user terminal, a wireless network device, a user agent, or a user apparatus. The terminal may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, a vehicle-mounted device, a wearable device, a terminal device in an internet of things, a terminal device in an internet of vehicles, a terminal device in any form in a future network, or the like.

A communication apparatus reports a BSR by using a media access control (MAC) control element (CE) at a MAC layer. For example, the MAC CE may be included in a MAC protocol data unit (PDU). For example, one MAC PDU may include one or more MAC subPDUs. For example, one MAC subPDU may include any one of the following:

(1) one MAC subheader;

(2) one MAC subheader and one MAC service data unit (SDU);

(3) one MAC subheader and one MAC CE; and (4) one MAC subheader and padding.

Figure 3:
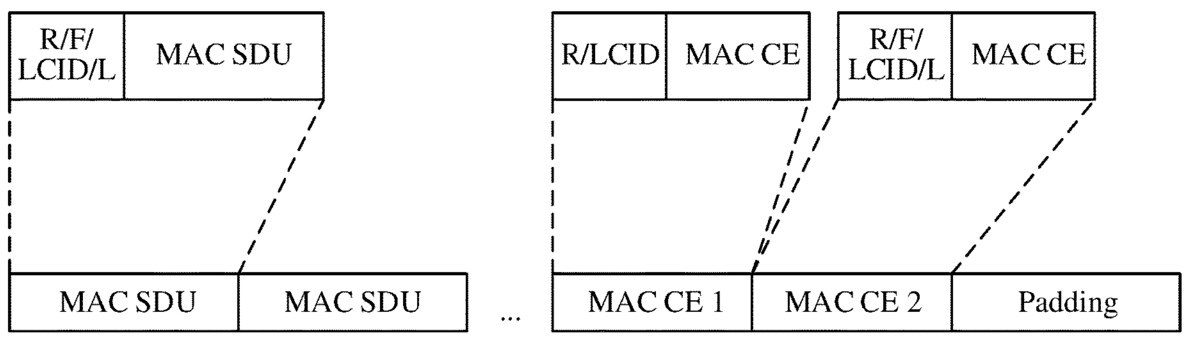
FIG. 3 is a schematic diagram of a structure of a MAC PDU according to an embodiment of this application.

FIG. 3 is a schematic diagram of a structure of a MAC PDU according to an embodiment of this application. The MAC PDU shown in FIG. 3 includes at least five MAC subPDUs, including two MAC SDUs, one fixed-size MAC CE 1, one variable-size MAC CE 2, and padding. A subheader of each of the MAC SDUs and the variable-size MAC CE 2 includes four header fields R/F/LCID/L. A subheader of the fixed-size MAC CE 1 includes two header fields R/LCID. It may be understood that the descriptions of the MAC PDU shown in FIG. 3 is merely an example, and should not be construed as a limitation on embodiments of this application.

The R field is a reserved bit and is set to 0.

The L field represents a length of a corresponding MAC SDU or the variable-size MAC CE in octets. Each MAC subheader except for subheaders corresponding to a MAC SDU including an uplink common control channel (UL CCCH), the padding, and the fixed-size MAC CE includes one L field. A size of the L field is represented by an F field.

The F field occupies 1 bit and represents the size of the length field (L field). Each MAC subheader except for the subheaders corresponding to the fixed-size MAC CE, the padding, and the MAC SDU including the UL CCCH includes one F field. When the F field is 0, it indicates that the length field occupies 8 bits. When the F field is 1, it indicates that the length field occupies 16 bits.

The LCID field occupies 6 bits, and each MAC subheader has one LCID field. The field indicates a logical channel instance corresponding to the MAC SDU, a type corresponding to the MAC CE, or padding.

When the communication apparatus meets a BSR trigger condition, the communication apparatus triggers reporting of a BSR. The BSR trigger condition is as follows, and the communication apparatus triggers a BSR when one of the following conditions is met:

(1) New data arrives in the buffer: When an LCH belonging to any LCG has buffered data, and currently, no LCH in all the LCGs has buffered data, the communication apparatus triggers reporting of a BSR. The BSR is referred to as a regular BSR.

(2) High-priority data arrives: When an LCH belonging to any LCG has buffered data, and a priority of the LCH is higher than a priority of an LCH of any reported LCG, the communication apparatus triggers reporting of a BSR. The BSR is referred to as a regular BSR.

(3) The communication apparatus performs periodic reporting to a network device: The base station configures a timer for the communication apparatus by using a periodicBSR-Timer field in MAC-MainConfig. When the timer expires, the communication apparatus triggers reporting of a BSR. The BSR is referred to as a periodic BSR.

(4) Timing retransmission: Abase station configures a timer for the communication apparatus by using a retxBSR-Timer field in MAC-MainConfig. When the timer expires and any LCH of any LCG of the communication apparatus has buffered data, the communication apparatus triggers a BSR. The BSR is referred to as a regular BSR.

(5) When the communication apparatus has an uplink resource and data that needs to be sent is insufficient to fill the resource, a redundant bit is used as a padding bit. When a quantity of padding bits are greater than or equal to a size of "BSR MAC CE+corresponding subheader", the communication apparatus triggers a BSR, and sends the BSR by using the padding bits. The BSR is referred to as a padding Padding BSR.

It should be understood that the foregoing BSR trigger condition is merely an example. The BSR trigger condition in embodiments of this application is not limited to the foregoing five examples, and may further include another new BSR trigger condition that emerges with development of technologies.

Figure 4:
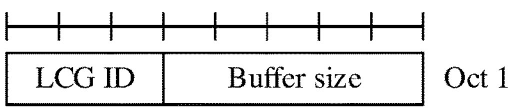
FIG. 4 is a schematic diagram of a structure of a BSR format according to an embodiment of this application.

FIG. 4 is a schematic diagram of a structure of a BSR format according to an embodiment of this application. The BSR format shown in FIG. 4 may be referred to as a regular short BSR format. A BSR in the regular short BSR format is used to report a buffer data volume of one LCG, and the BSR in the regular short BSR format includes one logical channel group identifier (LCGID) field and one buffer size (BS) field. The LCGID field indicates an identifier of the LCG reported by using the BSR, and the BS field indicates the buffer data volume of the LCG reported by using the BSR. For example, the BSR format shown in FIG. 4 occupies 1 octet (Oct), and the LCGID field occupies three bits. An identifier of an LCG indicated by using the three bits may represent an identifier of an LCG whose identifier is between 0 and 7. Therefore, the BSR in the regular short BSR format may report an LCG whose identifier is less than or equal to 7. AMAC layer quantizes actual buffer sizes of different LCGs, and the BS field indicates a buffer data volume range corresponding to an actual buffer size of an LCG. For example, the BS field occupies 5 bits, a value of the BS field indicates a buffer data volume range of the LCG, and the MAC layer quantizes an actual buffer size of the LCG into 32 buffer data volume ranges. The value of the BS field is an index of the buffer data volume range of the LCG, and indirectly indicates the buffer data volume range of the LCG. A mapping relationship between an index and a buffer data volume range of the LCG is shown in Table 1. As shown in Table 1, a BS value represents a buffer data volume range, and the unit is octet. An index indirectly indicates a buffer data volume range. One index corresponds to one buffer data volume range, and the index represents a value of a corresponding BS field. For example, it is assumed that a buffer data volume of an LCG is 100 octets, a buffer data volume range to which the buffer data volume belongs is 74<BS≤102, a corresponding index is 8, and a value of a corresponding BS field is "01000".

TABLE 1

| Index | BS value |
|---|---|
| 0 | 0 |
| 1 | ≤10 |
| 2 | ≤14 |
| 3 | ≤20 |
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |

TABLE 1-continued

| Index | BS value |
|---|---|
| 14 | ≤745 |
| 15 | ≤1038 |
| 16 | ≤1446 |
| 17 | ≤2014 |
| 18 | ≤2806 |
| 19 | ≤3909 |
| 20 | ≤5446 |
| 21 | ≤7587 |
| 22 | ≤10570 |
| 23 | ≤14726 |
| 24 | ≤20516 |
| 25 | ≤28581 |
| 26 | ≤39818 |
| 27 | ≤55474 |
| 28 | ≤77284 |
| 29 | ≤107669 |
| 30 | ≤150000 |
| 31 | >150000 |

For example, Table 1 may be specified in a protocol, or may be configured by a network device.

The BSR shown in FIG. 4 may also be referred to as a regular short truncated BSR format. A BSR in the regular short truncated BSR format is used to report a buffer data volume of one of LCGs having buffered data. The LCG may be a high-priority LCG in the LCGs having buffered data. A priority of the LCG is determined based on priorities of LCHs included in the LCG, and a priority of a highest-priority LCH in LCHs included in each LCG is used as the priority of the LCG. When a communication apparatus triggers a padding BSR and a quantity of padding bits can support reporting a buffer data volume of only one LCG, the communication apparatus reports, by using a BSR in the regular short truncated BSR format, a buffer data volume of a highest-priority LCG in the LCGs having buffer data volumes.

Figure 5:
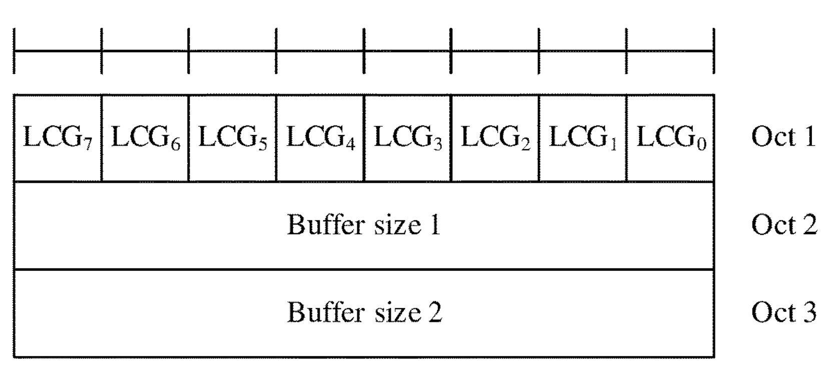
FIG. 5 is a schematic diagram of a structure of another BSR format according to an embodiment of this application.

FIG. 5 is a schematic diagram of a structure of another BSR format according to an embodiment of this application. The BSR format shown in FIG. 5 may be denoted as a regular long BSR format. A BSR in the regular long BSR format is used to report buffer data volumes of one or more LCGs. The BSR in the regular long BSR format includes one bitmap and one or more BS fields. Each bit in the bitmap indicates whether one LCG has buffered data, or indicates whether a BS field corresponding to one LCG exists. Each of the one or more BS fields indicates a buffer data volume of one of the one or more LCGs. A quantity of BS fields included in the BSR in the regular long BSR format is a quantity of LCGs reported by using the BSR. That is, m in FIG. 5 is the quantity of LCGs reported by using the BSR.

For the BSR in the regular long BSR format, each bit in the bitmap indicates whether a BS field corresponding to the LCG exists. The bitmap may include a plurality of LCGi fields, and the LCGi field indicates whether a BS field corresponding to the $i^{th}$ LCG exists. In the BSR in the regular long BSR format, the quantity of BS fields is equal to a quantity of LCGs having buffered data, and the LCGi field may further indicate whether the $i^{th}$ LCG has buffered data. When a value of the LCGi field is 1, it indicates that the BSR includes the BS field corresponding to the $i^{th}$ LCG. That is, the $i^{th}$ LCG has buffered data. When the value of the LCGi field is 0, it indicates that the BSR does not include the BS field corresponding to the $i^{th}$ LCG. That is, the $i^{th}$ LCG has no buffered data. It should be understood that the value of the LCGi field in the bitmap being 1 or 0 is merely an example, and should not constitute a limitation on this application. For example, the value of the LCGi field may be 2, 3, 4, or the like provided that the value of the LCGi field when the $i^{th}$ LCG has buffered data is different from the value of the LCGi field when the $i^{th}$ LCG has no buffered data, so that a network device can determine, based on the value of the LCGi field in the bitmap, whether the corresponding $i^{th}$ LCG has buffered data. The one or more BS fields may be arranged based on priorities of corresponding LCGs. That is, a BS field corresponding to a higher-priority LCG is arranged before a BS field corresponding to a lower-priority LCG.

The BSR format shown in FIG. 5 may also be referred to as a regular long truncated BSR format. For a BSR in the regular long truncated BSR format, each bit in a bitmap indicates whether a corresponding LCG has buffered data. The BSR in the regular long truncated BSR format is used to report buffer data volumes of a part of all LCGs having buffered data, and not all LCGs having buffered data are reported. That is, not all LCGs having buffered data have a corresponding BS field. Therefore, in the BSR in the regular long truncated BSR format, an LCGi field indicates whether the $i^{th}$ LCG has buffered data. When a value of the LCGi field is 1, it indicates that the $i^{th}$ LCG has buffered data. When a value of the LCGi field is 0, it indicates that the $i^{th}$ LCG has no buffered data. It should be understood that the value of the LCGi field in the bitmap being 1 or 0 is merely an example, and should not constitute a limitation on this application. For example, the value of the LCGi field may be 2, 3, 4, or the like provided that the value of the LCGi field when the $i^{th}$ LCG has buffered data is different from the value of the LCGi field when the $i^{th}$ LCG has no buffered data, so that a network device can determine, based on the value of the LCGi field in the bitmap, whether the corresponding $i^{th}$ LCG has buffered data. The BSR in the regular long truncated BSR format reports buffer data volumes of some high-priority LCGs in the LCGs having buffered data. BS fields in the BSR in the regular long truncated BSR format may be arranged based on priorities of LCGs corresponding to the BS fields. That is, a BS field corresponding to a higher-priority LCG is arranged before a BS field corresponding to a lower-priority LCG.

For example, the bitmap occupies 1 octet, and includes 8 bits. Each of the 8 bits indicates whether each of eight LCGs has buffered data, or indicates whether a BS field corresponding to each of eight LCGs exists. Each of the one or more BS fields occupies 1 octet, and a value of the BS field is an index of a buffer data volume range of an LCG, and indirectly indicates the buffer data volume range of the LCG. A mapping relationship between an index and a buffer data volume range of the LCG is shown in Table 2. As shown in Table 2, a BS value represents a buffer data volume range, and the unit is octet. An index indirectly indicates a buffer data volume range. One index corresponds to one buffer data volume range, and the index represents a value of a corresponding BS field.

TABLE 2

| Index | BS value |
|---|---|
| 0 | 0 |
| 1 | ≤10 |
| 2 | ≤11 |
| 3 | ≤12 |
| 4 | ≤13 |
| 5 | ≤14 |
| 6 | ≤15 |
| 7 | ≤16 |

TABLE 2-continued

| Index | BS value |
|---|---|
| 8 | ≤17 |
| 9 | ≤18 |
| 10 | ≤19 |
| 11 | ≤20 |
| 12 | ≤22 |
| 13 | ≤23 |
| 14 | ≤25 |
| 15 | ≤26 |
| 16 | ≤28 |
| 17 | ≤30 |
| 18 | ≤32 |
| 19 | ≤34 |
| 20 | ≤36 |
| 21 | ≤38 |
| 22 | ≤40 |
| 23 | ≤43 |
| 24 | ≤46 |
| 25 | ≤49 |
| 26 | ≤52 |
| 27 | ≤55 |
| 28 | ≤59 |
| 29 | ≤62 |
| 30 | ≤66 |
| 31 | ≤71 |
| 32 | ≤75 |
| 33 | ≤80 |
| 34 | ≤85 |
| 35 | ≤91 |
| 36 | ≤97 |
| 37 | ≤103 |
| 38 | ≤110 |
| 39 | ≤117 |
| 40 | ≤124 |
| 41 | ≤132 |
| 42 | ≤141 |
| 43 | ≤150 |
| 44 | ≤160 |
| 45 | ≤170 |
| 46 | ≤181 |
| 47 | ≤193 |
| 48 | ≤205 |
| 49 | ≤218 |
| 50 | ≤233 |
| 51 | ≤248 |
| 52 | ≤264 |
| 53 | ≤281 |
| 54 | ≤299 |
| 55 | ≤318 |
| 56 | ≤339 |
| 57 | ≤361 |
| 58 | ≤384 |
| 59 | ≤409 |
| 60 | ≤436 |
| 61 | ≤464 |
| 62 | ≤494 |
| 63 | ≤526 |
| 64 | ≤560 |
| 65 | ≤597 |
| 66 | ≤635 |
| 67 | ≤677 |
| 68 | ≤720 |
| 69 | ≤767 |
| 70 | ≤817 |
| 71 | ≤870 |
| 72 | ≤926 |
| 73 | ≤987 |
| 74 | ≤1051 |
| 75 | ≤1119 |
| 76 | ≤1191 |
| 77 | ≤1269 |
| 78 | ≤1351 |
| 79 | ≤1439 |
| 80 | ≤1532 |
| 81 | ≤1631 |
| 82 | ≤1737 |
| 83 | ≤1850 |
| 84 | ≤1970 |
| 85 | ≤2098 |

TABLE 2-continued

| Index | BS value |
|---|---|
| 86 | ≤2234 |
| 87 | ≤2379 |
| 88 | ≤2533 |
| 89 | ≤2698 |
| 90 | ≤2873 |
| 91 | ≤3059 |
| 92 | ≤3258 |
| 93 | ≤3469 |
| 94 | ≤3694 |
| 95 | ≤3934 |
| 96 | ≤4189 |
| 97 | ≤4461 |
| 98 | ≤4751 |
| 99 | ≤5059 |
| 100 | ≤5387 |
| 101 | ≤5737 |
| 102 | ≤6109 |
| 103 | ≤6506 |
| 104 | ≤6928 |
| 105 | ≤7378 |
| 106 | ≤7857 |
| 107 | ≤8367 |
| 108 | ≤8910 |
| 109 | ≤9488 |
| 110 | ≤10104 |
| 111 | ≤10760 |
| 112 | ≤11458 |
| 113 | ≤12202 |
| 114 | ≤12994 |
| 115 | ≤13838 |
| 116 | ≤14736 |
| 117 | ≤15692 |
| 118 | ≤16711 |
| 119 | ≤17795 |
| 120 | ≤18951 |
| 121 | ≤20181 |
| 122 | ≤21491 |
| 123 | ≤22885 |
| 124 | ≤24371 |
| 125 | ≤25953 |
| 126 | ≤27638 |
| 127 | ≤29431 |
| 128 | ≤31342 |
| 129 | ≤33376 |
| 130 | ≤35543 |
| 131 | ≤37850 |
| 132 | ≤40307 |
| 133 | ≤42923 |
| 134 | ≤45709 |
| 135 | ≤48676 |
| 136 | ≤51836 |
| 137 | ≤55200 |
| 138 | ≤58784 |
| 139 | ≤62599 |
| 140 | ≤66663 |
| 141 | ≤70990 |
| 142 | ≤75598 |
| 143 | ≤80505 |
| 144 | ≤85730 |
| 145 | ≤91295 |
| 146 | ≤97221 |
| 147 | ≤103532 |
| 148 | ≤110252 |
| 149 | ≤117409 |
| 150 | ≤125030 |
| 151 | ≤133146 |
| 152 | ≤141789 |
| 153 | ≤150992 |
| 154 | ≤160793 |
| 155 | ≤171231 |
| 156 | ≤182345 |
| 157 | ≤194182 |
| 158 | ≤206786 |
| 159 | ≤220209 |
| 160 | ≤234503 |
| 161 | ≤249725 |
| 162 | ≤265935 |
| 163 | ≤283197 |

TABLE 2-continued

| Index | BS value |
|---|---|
| 164 | ≤301579 |
| 165 | ≤321155 |
| 166 | ≤342002 |
| 167 | ≤364202 |
| 168 | ≤387842 |
| 169 | ≤413018 |
| 170 | ≤439827 |
| 171 | ≤468377 |
| 172 | ≤498780 |
| 173 | ≤531156 |
| 174 | ≤565634 |
| 175 | ≤602350 |
| 176 | ≤641449 |
| 177 | ≤683087 |
| 178 | ≤727427 |
| 179 | ≤774645 |
| 180 | ≤824928 |
| 181 | ≤878475 |
| 182 | ≤935498 |
| 183 | ≤996222 |
| 184 | ≤1060888 |
| 185 | ≤1129752 |
| 186 | ≤1203085 |
| 187 | ≤1281179 |
| 188 | ≤1364342 |
| 189 | ≤1452903 |
| 190 | ≤1547213 |
| 191 | ≤1647644 |
| 192 | ≤1754595 |
| 193 | ≤1868488 |
| 194 | ≤1989774 |
| 195 | ≤2118933 |
| 196 | ≤2256475 |
| 197 | ≤2402946 |
| 198 | ≤2558924 |
| 199 | ≤2725027 |
| 200 | ≤2901912 |
| 201 | ≤3090279 |
| 202 | ≤3290873 |
| 203 | ≤3504487 |
| 204 | ≤3731968 |
| 205 | ≤3974215 |
| 206 | ≤4232186 |
| 207 | ≤4506902 |
| 208 | ≤4799451 |
| 209 | ≤5110989 |
| 210 | ≤5442750 |
| 211 | ≤5796046 |
| 212 | ≤6172275 |
| 213 | ≤6572925 |
| 214 | ≤6999582 |
| 215 | ≤7453933 |
| 216 | ≤7937777 |
| 217 | ≤8453028 |
| 218 | ≤9001725 |
| 219 | ≤9586039 |
| 220 | ≤10208280 |
| 221 | ≤10870913 |
| 222 | ≤11576557 |
| 223 | ≤12328006 |
| 224 | ≤13128233 |
| 225 | ≤13980403 |
| 226 | ≤14887889 |
| 227 | ≤15854280 |
| 228 | ≤16883401 |
| 229 | ≤17979324 |
| 230 | ≤19146385 |
| 231 | ≤20389201 |
| 232 | ≤21712690 |
| 233 | ≤23122088 |
| 234 | ≤24622972 |
| 235 | ≤26221280 |
| 236 | ≤27923336 |
| 237 | ≤29735875 |
| 238 | ≤31666069 |
| 239 | ≤33721553 |
| 240 | ≤35910462 |
| 241 | ≤38241455 |
| 242 | ≤40723756 |
| 243 | ≤43367187 |
| 244 | ≤46182206 |
| 245 | ≤49179951 |
| 246 | ≤52372284 |
| 247 | ≤55771835 |
| 248 | ≤59392055 |
| 249 | ≤63247269 |
| 250 | ≤67352729 |
| 251 | ≤71724679 |
| 252 | ≤76380419 |
| 253 | ≤81338368 |
| 254 | >81338368 |
| 255 | Reserved |

Figure 6:
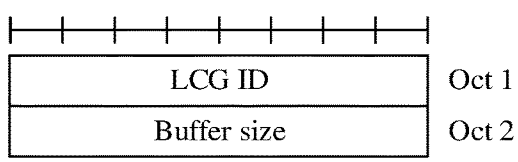
FIG. 6 is a schematic diagram of a structure of another BSR format according to an embodiment of this application.

For an IAB network scenario, an LCID field is extended to 16 bits in R16, and a quantity of LCGs is extended to 256 in R17. FIG. 6 is a schematic diagram of a structure of another BSR format according to an embodiment of this application. A BSR format shown in FIG. 6 may be referred to as an extended short BSR format. A BSR in the extended short BSR format is used to report a buffer data volume of one LCG, and the BSR in the extended short BSR format includes one LCGID field and one BS field. The LCGID field indicates an identifier of the LCG, and the B S field indicates the buffer data volume of the LCG. A quantity of bits occupied by the LCGID field in the BSR in the extended short BSR format is greater than a quantity of bits occupied by the LCGID field in the BSR in the regular short BSR format shown in FIG. 4. For example, the BSR in the extended short BSR format occupies 2 octets. The LCGID field occupies 1 octet, and 8 bits indicate the identifier of the LCG, and may indicate an identifier of an LCG whose identifier is between 0 and 255. Therefore, the BSR in the extended short BSR format may report a buffer data volume of an LCG whose identifier is less than 256. The BS field occupies 1 octet, and a value of the BS field indicates a buffer data volume range of the reported LCG. A mapping relationship between the buffer data volume range of the LCG and the value of the BS field is shown in Table 2.

The BSR shown in FIG. 6 may also be referred to as an extended short truncated BSR format. A BSR in the extended short truncated BSR format is used to report a buffer data volume of one of LCGs having buffered data. The LCG may be a highest-priority LCG in the LCGs having buffered data. When a communication apparatus triggers a padding BSR and a quantity of padding bits can support reporting a buffer data volume of only one LCG, the communication apparatus reports, by using the BSR in the extended short truncated BSR format, the buffer data volume of the highest-priority LCG in the LCGs having buffer data volumes.

Figure 7:
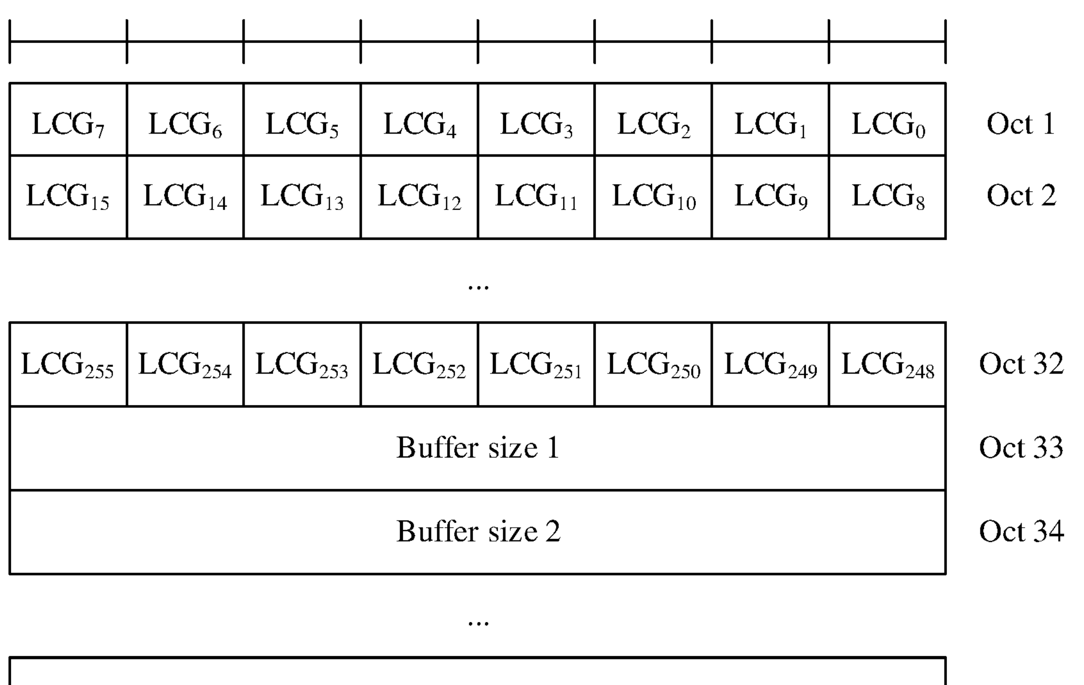
FIG. 7 is a schematic diagram of a structure of another BSR format according to an embodiment of this application.

FIG. 7 is a schematic diagram of a structure of another BSR format according to an embodiment of this application. The BSR format shown in FIG. 7 may be referred to as an extended long BSR format. A BSR in the extended long BSR format is used to report buffer data volumes of one or more LCGs, and the BSR includes one bitmap and one or more BS fields. Each bit in the bitmap indicates whether one LCG has buffered data, or indicates whether a BS field corresponding to one LCG exists. Each of the one or more BS fields indicates a buffer data volume of each of the one or more LCGs. A quantity of BS fields included in the BSR in the extended long BSR format is a quantity of LCGs reported by using the BSR. That is, m in FIG. 7 is the quantity of LCGs reported by using the BSR.

For the BSR in the extended long BSR format, each bit in the bitmap indicates whether a BS field corresponding to the LCG exists. The bitmap may include a plurality of LCGi fields, and the LCGi field indicates whether a BS field corresponding to the $i^{th}$ LCG exists. In the BSR in the extended long BSR format, a quantity of BS fields is equal to a quantity of LCGs having buffered data, and the LCGi field may further indicate whether the $i^{th}$ LCG has buffered data. When a value of the LCGi field is 1, it indicates that the BSR includes the BS field corresponding to the $i^{th}$ LCG. That is, the $i^{th}$ LCG has buffered data. When the value of the LCGi field is 0, it indicates that the BSR does not include the BS field corresponding to the $i^{th}$ LCG. That is, the $i^{th}$ LCG has no buffered data. It should be understood that the value of the LCGi field in the bitmap being 1 or 0 is merely an example, and should not constitute a limitation on this application. For example, the value of the LCGi field may be 2, 3, 4, or the like provided that the value of the LCGi field when the $i^{th}$ LCG has buffered data is different from the value of the LCGi field when the $i^{th}$ LCG has no buffered data, so that a network device can determine, based on the value of the LCGi field in the bitmap, whether the corresponding $i^{th}$ LCG has buffered data. The one or more BS fields may be arranged based on identifiers of corresponding LCGs, or may be arranged based on priorities of corresponding LCGs. That is, a BS field corresponding to a higher-priority LCG is arranged before a BS field corresponding to a lower-priority LCG. A priority of the LCG is determined based on priorities of LCHs included in the LCG, and a priority of a highest-priority LCH in the LCHs included in each LCG is used as the priority of the LCG.

The BSR format shown in FIG. 7 may also be referred to as an extended long truncated BSR format. Each bit in a bitmap of a BSR in the extended long truncated BSR format indicates whether a corresponding LCG has buffered data. The BSR in the extended long truncated BSR format is used to report buffer data volumes of a part of all LCGs having buffered data, and not all LCGs having buffered data are reported. That is, not all LCGs having buffered data have a corresponding BS field. Therefore, in the BSR in the extended long truncated BSR format, an LCGi field indicates whether the $i^{th}$ LCG has buffered data. When a value of the LCGi field is 1, it indicates that the $i^{th}$ LCG has buffered data. When a value of the LCGi field is 0, it indicates that the $i^{th}$ LCG has no buffered data. It should be understood that the value of the LCGi field in the bitmap being 1 or 0 is merely an example, and should not constitute a limitation on this application. For example, the value of the LCGi field may be 2, 3, 4, or the like provided that the value of the LCGi field when the $i^{th}$ LCG has buffered data is different from the value of the LCGi field when the $i^{th}$ LCG has no buffered data, so that a network device can determine, based on the value of the LCGi field in the bitmap, whether the corresponding $i^{th}$ LCG has buffered data. The BSR in the extended long truncated BSR format reports buffer data volumes of some high-priority LCGs in the LCGs having buffered data. BS fields in the BSR in the extended long truncated BSR format may be arranged based on priorities of LCGs corresponding to the BS fields. That is, a BS field corresponding to a higher-priority LCG is arranged before a BS field corresponding to a lower-priority LCG.

A quantity of bits in the bitmap of the BSR in the BSR format shown in FIG. 7 is greater than a quantity of bits in the bitmap of the BSR in the BSR format shown in FIG. 5. For example, the bitmap of the BSR in the extended BSR format shown in FIG. 7 includes 256 bits, and each of the 256 bits indicates whether each of 256 LCGs has buffered data, or indicates whether a BS field corresponding to each of the 256 LCGs exists. Each of the one or more BS fields occupies 1 octet, and indicates a buffer data volume range of one LCG. A mapping relationship between a buffer data volume range of an LCG and a value of the BS field is shown in Table 2.

Figure 8A:
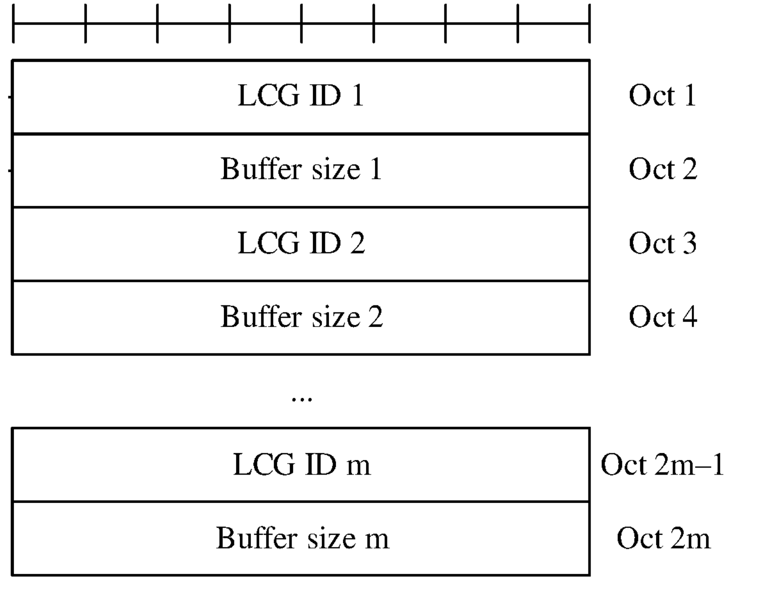
FIG. 8A is a schematic diagram of a structure of another BSR format according to an embodiment of this application.
Figure 8B:
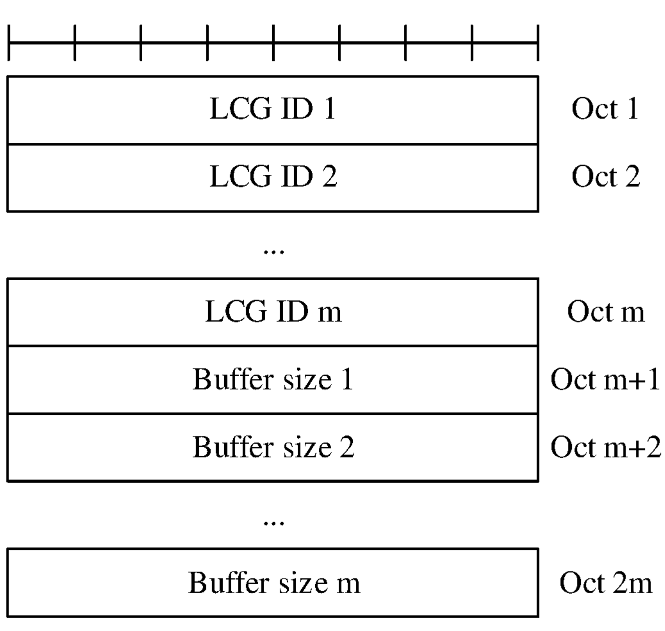
FIG. 8B is a schematic diagram of a structure of another BSR format according to an embodiment of this application.

When the BSR is reported by using the BSR format shown in FIG. 7, one bitmap needs to be reported each time, to indicate whether a corresponding LCG has buffered data, or to indicate whether a BS field corresponding to the LCG exists. When a quantity of LCGs that need to be reported is small, and the quantity of LCGs that need to be reported is less than a quantity of octets occupied by the bitmap, reporting the BSR by using the BSR format shown in FIG. 7 causes a waste of data. To improve resource utilization, an embodiment of this application provides a medium BSR format (Extended Long BSR format*). As shown in FIG. 8A, a BSR in the medium BSR format is used to report buffer data volumes of a plurality of LCGs, and the BSR in the medium BSR format includes a plurality of LCGID fields and a plurality of BS fields. Each of the plurality of LCGID fields indicates an identifier of one LCG, and each of the plurality of BS fields indicates a buffer data volume of one LCG. The plurality of LCGID fields one-to-one correspond to the plurality of BS fields. Any LCGID field in the plurality of LCGID fields uniquely indicates an identifier of one LCG, and a BS field corresponding to the LCG uniquely indicates a buffer data volume of the LCG. For example, any one of the plurality of LCGID fields occupies 1 octet, and indicates an identifier of one LCG. Therefore, the BSR in the medium BSR format may report a buffer data volume of an LCG whose identifier is between 0 and 255. Any one of the plurality of BS fields occupies 1 octet, and indicates a buffer data volume range of one LCG. A mapping relationship between a buffer data volume range of an LCG and a value of the BS field is shown in Table 2. As shown in FIG. 8A, the BSR format may sequentially include the plurality of LCGID fields and the plurality of BS fields. The plurality of LCGID fields may be arranged based on priorities of LCGs indicated by the LCGID fields. That is, a priority of an LCG corresponding to an LCGID 1 is higher than a priority of another LCG. An arrangement order of the plurality of BS fields corresponds to an arrangement order of the LCGID fields. That is, the $i^{th}$ BS field indicates a buffer data volume of an LCG indicated by the $i^{th}$ LCGID field. As shown in FIG. 8B, the BSR format may sequentially include an LCGID 1 field, a BS 1 field, an LCGID 2 field, and a BS 2 field. The LCGID 1 field indicates an identifier of the first LCG, the BS 1 field indicates a buffer data volume of the first LCG, the LCGID 2 indicates an identifier of the second LCG, and the BS 2 field indicates a buffer data volume of the second LCG. The LCGID field and the BS field that are corresponding to each LCG in FIG. 8B may be arranged based on a priority of the LCG. That is, a priority of the first LCG is higher than a priority of the second LCG. A difference between the BSR format shown in FIG. 8A and the BSR format shown in FIG. 8B lies in an arrangement order of the LCGID fields and the BS fields.

The BSR formats shown in FIG. 8A and FIG. 8B may also be referred to as a medium truncated BSR format. A BSR in the medium truncated BSR format is used to report buffer data volumes of a part of LCGs having buffered data. Some LCGs reported by using the BSR in the medium truncated BSR format may be some high-priority LCGs in the LCGs having buffered data.

An embodiment of this application provides a BSR reporting method, so that a BSR can be properly reported by effectively using the BSR format shown in FIG. 4 to FIG. 8B. The BSR formats shown in FIG. 4 to FIG. 8B are merely examples. The BSR formats in embodiments of this application are not limited to the BSR formats shown in FIG. 4 to FIG. 8B.

Figure 9:
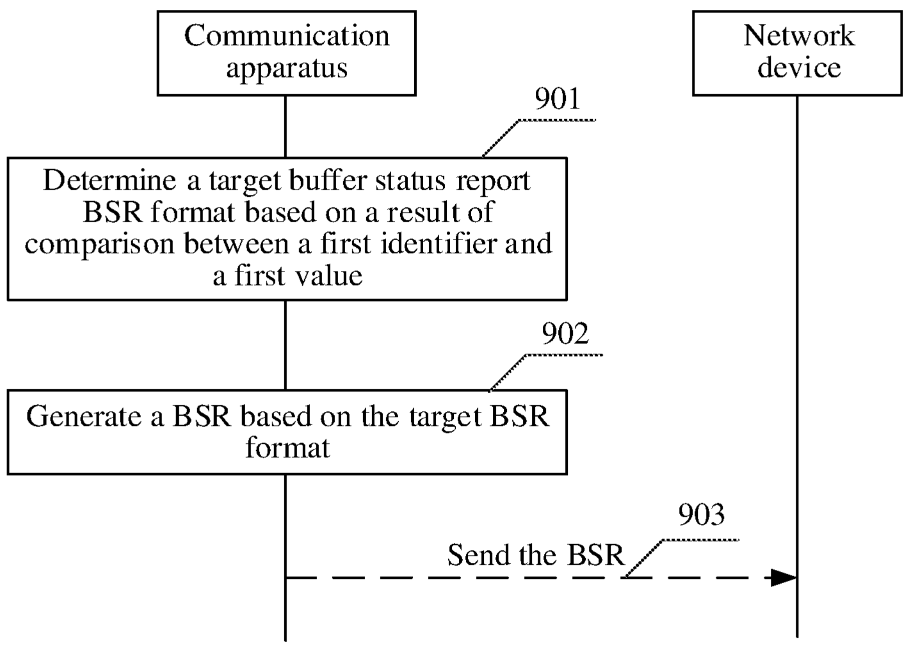
FIG. 9 is a schematic flowchart of a communication method according to an embodiment of this application.

FIG. 9 is a schematic flowchart of a communication method according to an embodiment of this application. It should be understood that FIG. 9 shows steps or operations of the communication method, but these steps or operations are merely an example. In this embodiment of this application, other operations or variations of the operations in FIG. 9 may be performed. The communication method shown in FIG. 9 is applied to interaction between a communication apparatus and a network device. The communication method shown in FIG. 9 may be performed by the communication apparatus. When the communication apparatus has buffered data to be uploaded, the steps shown in FIG. 9 are performed to generate a BSR, send the BSR to the network device, and report a buffer data volume of the communication apparatus to the network device, so that the network device allocates an uplink transmission resource to the communication apparatus based on the buffer data volume of the communication apparatus. In this embodiment of this application, the communication apparatus is a device equipped with a processor that may be configured to indicate a computer to execute instructions. The communication apparatus may be a terminal device, or may be a network node (for example, an IAB node). The communication method shown in FIG. 9 may be applied to an IAB network. When performing the communication method shown in FIG. 9, a terminal device may send a BSR to the network device through a Uu link. When an IAB node performs the communication method shown in FIG. 9, the communication method is performed by an MT part of the IAB node, and a BSR is sent to a parent node of the IAB node through a BH link. As shown in FIG. 9, the communication method may include but is not limited to the following steps.

901: Determine a target buffer status report BSR format based on a result of comparison between a first identifier and a first value, where the first identifier is a largest LCG identifier in LCG identifiers of LCGs having buffered data.

For example, a specific value of the first value may be set by the network device, and the first value may be specifically 7. The communication apparatus may determine, from a plurality of BSR formats based on the result of comparison between the first identifier and the first value, the target BSR format used for reporting a BSR.

For example, there are at least two different BSR formats in the plurality of BSR formats, and largest values of LCG identifiers of LCGs that can be reported by using BSRs in the two BSR formats are different. Therefore, the communication apparatus can determine the target BSR format from the plurality of BSR formats based on the result of comparison between the first identifier and the first value. The BSRs in the two BSR formats occupy different quantities of bits to report a same quantity of LCGs.

For example, the first value may be equal to a largest value of LCG identifiers of LCGs that can be reported in one of the plurality of BSR formats. When the first identifier is less than or equal to the first value, the communication apparatus determines the BSR format as the target BSR format.

For example, the communication apparatus may perform step 901 when a BSR trigger condition is met. For the BSR trigger condition, refer to the related descriptions in FIG. 3. For example, the BSR trigger condition includes a buffer. It may be understood that the trigger condition shown herein is merely an example. In specific implementation, the terminal device may further trigger performing of step 901 based on another trigger condition.

902: Generate a BSR based on the target BSR format.

For example, the communication apparatus determines a value of each field in the target BSR format based on the identifiers and buffer data volumes of the LCGs having buffered data, and generates the BSR. For example, when the target BSR format is a regular long BSR format shown in FIG. 5, there are three LCGs having buffered data, namely, an LCG 0, an LCG 2, and an LCG 5. In this case, the $0^{th}$ bit, the $2^{nd}$ bit, and the $5^{th}$ bit in a bitmap of the generated BSR in the regular long BSR format are 1, and other bits in the bitmap are 0. The BSR includes three BS fields, and values of the three BS fields respectively correspond to indexes of buffer data volume ranges of the LCG 0, the LCG 2, and the LCG 5. The BSR in the target BSR format generated by the communication apparatus is included in a MAC PDU.

In an implementation, one MAC PDU may include a plurality of BSRs. When the communication apparatus generates a MAC PDU, if the first identifier is greater than the first value, it indicates that at least one of the LCG identifiers of the LCGs having buffered data is greater than the first value. The communication apparatus may separately report, by using BSRs in two BSR formats, LCGs whose LCG identifiers are less than or equal to the first value in the LCGs having buffered data and LCGs whose LCG identifiers are greater than the first value in the LCGs having buffered data.

For example, the communication apparatus may report, by using a BSR in a first format, buffer data volumes of LCGs whose LCG identifiers are greater than the first value in the LCGs having buffered data, and report, by using a BSR in a second format, buffer data volumes of LCGs whose LCG identifiers are less than or equal to the first value in the LCGs having buffered data. A largest value in the LCG identifiers of the LCGs that can be reported by using the BSR in the first format is greater than a largest value in the LCG identifiers of the LCGs that can be reported by using the BSR in the second format. The first value may be equal to the largest value in the LCG identifiers of the LCGs that can be reported by using the BSR in the second format.

In a possible implementation, the method shown in FIG. 9 further includes the following step:

903: Send the BSR to the network device.

The communication apparatus sends the BSR in the target BSR format to the network device by using the MAC PDU, and reports a buffer data volume of the communication apparatus to the network device, so that the network device determines, based on the buffer data volume of the communication apparatus, a quantity of uplink transmission resources allocated to the communication apparatus.

In this embodiment of this application, the communication apparatus may determine, based on the result of comparison between the first identifier and the first value, a proper BSR format for reporting the BSR, so that an uplink transmission resource can be properly used to report the BSR, to implement refined scheduling of a network resource.

To understand step 901 shown in FIG. 9 in more detail, this embodiment of this application further provides the following several implementations:

Implementation 1:

The determining a target BSR format based on a result of comparison between a first identifier and a first value includes:

when the first identifier is greater than the first value, determining the first format as the target BSR format, where the BSR in the first format is used to report a buffer data volume of an LCG whose LCG identifier is within a first identifier threshold; or when the first identifier is less than or equal to the first value, determining the second format as the target BSR format, where the BSR in the second format is used to report a buffer data volume of an LCG whose LCG identifier is within a second identifier threshold.

The first identifier threshold is greater than the second identifier threshold. The plurality of BSR formats may include the first format and the second format, and identifier ranges of LCG identifiers of LCGs that can be reported by using the BSR in the first format and the BSR in the second format are different. For example, the communication apparatus may determine, based on the first identifier, an identifier range to which an LCG identifier of an LCG that needs to be reported belongs, and determine the target BSR format corresponding to the identifier range.

For example, the first value may be equal to the largest value in the LCG identifiers of the LCGs that can be reported by using the BSR in the second format. That is, the first value may be equal to the second identifier threshold. The BSR in the second format cannot report an LCG whose LCG identifier is greater than the first value. When the first identifier is less than or equal to the first value, the second format is determined as the target BSR format. When the first identifier is greater than the first value, the first format is determined as the target BSR format.

For example, when buffer data volumes of a same quantity of LCGs are reported, a quantity of bits occupied by the BSR in the first format is greater than a quantity of bits occupied by the BSR in the second format. The BSR in the first format includes a first LCGID field or a first bitmap. The first LCGID field indicates an identifier of a reported LCG. Each bit in the first bitmap indicates whether each of at least one LCG has buffered data, or indicates whether a buffer size BS field corresponding to each of the at least one LCG exists. The BSR in the second format includes a second LCGID field or a second bitmap. The second LCGID field indicates an identifier of a reported LCG. Each bit in the second bitmap indicates whether each of at least one LCG has buffered data, or indicates whether a buffer size BS field corresponding to each of the at least one LCG exists. A quantity of bits of the first LCGID field is greater than a quantity of bits of the second LCGID field, and a quantity of bits of the first bitmap is greater than a quantity of bits of the second bitmap.

When the first identifier is greater than the first value, an LCG identifier of an LCG having buffered data is greater than the second identifier threshold, and the BSR in the second format cannot report a buffer data volume of an LCG whose LCG identifier is greater than the second identifier threshold. Therefore, the BSR in the first format is used to report a buffer data volume of the LCG having buffered data. When the first identifier is less than or equal to the first value, an LCG identifier of an LCG having buffered data is less than or equal to the second identifier threshold, and the BSR in the second format may be used to report a buffer data volume of the LCG having buffered data. It should be understood that when the first identifier is less than or equal to the first value, the communication apparatus may alternatively use the BSR in the first format to report the buffer data volume of the LCG having buffered data. When the first identifier is less than or equal to the first value, and buffer data volumes of a same quantity of LCG are reported, a quantity of bits occupied by the BSR in the first format is greater than a quantity of bits occupied by the BSR in the second format.

For example, the first identifier threshold may be 255, and the BSR in the first format may report an LCG whose LCG identifier is between 0 and 255. The second identifier threshold may be 7, and the BSR in the second format may report an LCG whose LCG identifier is between 0 and 7. The first format may include the extended short BSR format shown in FIG. 6, the extended long BSR format shown in FIG. 7, and the medium BSR format shown in FIG. 8A or FIG. 8B. The second format may include the regular short BSR format shown in FIG. 4 and the regular long BSR format shown in FIG. 5. When the first identifier is greater than 7, the communication apparatus determines the first format as the target BSR format. When the first identifier is less than or equal to 7, the communication apparatus determines the second format as the target BSR format.

In this embodiment of this application, when a same quantity of LCGs are reported, a quantity of bits of the BSR in the first format is greater than that of the BSR in the second format, and the BSR in the second format cannot report an LCG whose LCG identifier is greater than the first value. When the first identifier is greater than the first value, the first format is determined as the target BSR format. When the first identifier is less than or equal to the first value, the second format is determined as the target BSR format. While integrity of a reported LCG having buffered data is ensured, a quantity of bits required for reporting a BSR is reduced, and resource utilization is improved.

In an implementation, the communication apparatus may further determine a specific format of the first format or the second format based on a quantity of LCGs having buffered data. That the communication apparatus determines a specific format of the first format based on a quantity of LCGs having buffered data may include the following steps:

When the quantity of LCGs having buffered data is 1, the first format or the second format is a short BSR format.

When the quantity of LCGs having buffered data is greater than 1 and less than a second value, the first format or the second format is a medium BSR format.

When the quantity of LCGs having buffered data is greater than or equal to the second value, the first format or the second format is a long BSR format.

For example, a BSR in the short BSR format is used to report a buffer data volume of one LCG, and the BSR in the short BSR format includes an LCG identifier of a first LCG and indication information that indicates a buffer data volume of the first LCG. The first LCG is an LCG having buffered data. When the second format is the short BSR format, the BSR in the second format is used to report a buffer data volume of one LCG whose LCG identifier is within the second identifier threshold. When the first format is the short BSR format, the BSR in the first format is used to report a buffer data volume of one LCG whose LCG identifier is within the first identifier threshold. The BSR in the first format includes a first LCGID field, and the first LCGID field indicates an identifier of the LCG. For example, when the first format is the short BSR format, the first format may be the extended short BSR format shown in FIG. 6. The BSR in the second format includes a second LCGID field, and the second LCGID field indicates an identifier of the LCG. When both the first format and the second format are short BSR formats, a quantity of bits of the BSR in the first format is greater than a quantity of bits of the BSR in the second format. A quantity of bits of the first LCGID field is greater than a quantity of bits of the second LCGID. For example, when the second format is the short BSR format, the second format may be the regular short BSR format shown in FIG. 4.

A BSR in the medium BSR format is used to report buffer data volumes of one or more LCGs. The BSR in the medium BSR format includes an LCG identifier of at least one LCG and indication information that indicates a buffer data volume of the at least one LCG. The at least one LCG is at least one LCG in the LCGs having buffered data. When the first format is the medium BSR format, the BSR in the first format is used to report a buffer data volume of an LCG whose LCG identifier is within the first identifier threshold. The BSR in the first format includes at least one LCGID field. For example, when the first format is the medium BSR format, the first format may be the medium BSR format shown in FIG. 8A or FIG. 8B. When the second format is the medium BSR format, the BSR in the second format is used to report a buffer data volume of an LCG whose LCG identifier is within the second identifier threshold. The BSR in the second format includes at least one LCGID field. For example, a quantity of bits of any one of the at least one LCGID field in the BSR in the second format is less than a quantity of bits of any one of the at least one LCGID field in the BSR in the first format.

A BSR in the long BSR format is used to report buffer data volumes of one or more LCGs. The BSR in the long BSR format includes a first bitmap. Each bit in the first bitmap indicates whether each of at least one LCG has buffered data, or indicates whether a buffer size BS field corresponding to each of the at least one LCG exists. The at least one LCG includes the LCG having buffered data. For example, when the first format is the long BSR format, the BSR in the first format is used to report a buffer data volume of an LCG whose LCG identifier is within the first identifier threshold, and the BSR in the first format includes the first bitmap. For example, when the first format is the long BSR format, the first format may be the extended long BSR format shown in FIG. 7. When the second format is the long BSR format, the BSR in the second format is used to report a buffer data volume of an LCG whose LCG identifier is within the second identifier threshold, the BSR in the second format includes a second bitmap, and a quantity of bits of the second bitmap is less than a quantity of bits of the first bitmap. For example, when the second format is the long BSR format, the second format may be the regular long BSR format shown in FIG. 5.

The second value may be determined based on a quantity of octets occupied by the first bitmap in the BSR in the long BSR format. The second value may be specifically the quantity of octets occupied by the first bitmap in the BSR in the long BSR format. When reporting the BSR in the long BSR format, the communication apparatus needs to report a bitmap, and the bitmap occupies a quantity of bits. When a quantity of LCGs that need to be reported is less than a quantity of octets occupied by the bitmap, a resource waste is caused. Therefore, when the quantity of LCGs that need to be reported is less than the quantity of octets occupied by the bitmap, the communication apparatus reports a BSR in the medium BSR format, so that a quantity of bits required for reporting the BSR can be reduced, and resource utilization can be improved.

For example, when the second identifier threshold is 7, the BSR in the second format is used to report a buffer data volume of an LCG whose LCG identifier is between 0 and 7. The second bitmap may occupy 1 octet, and a value of the second value is 1. Therefore, the quantity of LCGs having buffered data is not less than the second value. Therefore, when the second identifier threshold is 7, the second format may be the short BSR format or the long BSR format. When the quantity of LCGs having buffered data is 1, the second format is the short BSR format. When the quantity of LCGs having buffered data is greater than 1, the second format is the long BSR format.

The following describes determining of the target BSR format by using an example in which the first value may be 7, the first identifier threshold may be 255, and the second identifier threshold is 7. Determining of the target BSR format in different cases is specifically as follows:

When the first identifier is greater than the first value and the quantity of LCGs having buffered data is 1, an extended short BSR format is determined as the target BSR format.

When the first identifier is greater than the first value, and the quantity of LCGs having buffered data is greater than 1 and less than 32, a medium BSR format is determined as the target BSR format.

When the first identifier is greater than the first value and the quantity of LCGs having buffered data is greater than 32, an extended long BSR format is determined as the target BSR format.

When the first identifier is less than or equal to the first value and the quantity of LCGs having buffered data is 1, a regular short BSR format is determined as the target BSR format.

When the first identifier is less than or equal to the first value and the quantity of LCGs having buffered data is greater than 1, a regular long BSR format is determined as the target BSR format.

In an implementation, the communication apparatus may further determine a specific format of the first format based on a quantity of padding bits. For a padding BSR, the communication apparatus may determine, based on the result of comparison between the first identifier and the first value, the quantity of LCGs having buffered data, and the quantity of padding bits, the target BSR format used for reporting the BSR. That the communication apparatus determines a specific format of the first format based on the quantity of padding bits may include the following several cases.

Case 1: When the first identifier is greater than the first value and the quantity of LCGs having buffered data is greater than or equal to the second value, the communication apparatus determines the specific format of the first format based on the quantity of padding bits.

The communication apparatus determines a size of the BSR in the long BSR format and a size of a MAC subheader of the BSR in the long BSR format. The size of the BSR in the long BSR format is a quantity of bits occupied when the BSR in the long BSR format reports all the LCGs having buffered data. The quantity of padding bits is compared with a sixth value. The sixth value is the size of the BSR in the long BSR format plus the size of the MAC subheader of the BSR in the long BSR format. When the quantity of padding bits is greater than or equal to the sixth value, the first format is the long BSR format.

When the quantity of padding bits is less than the sixth value and is greater than or equal to a fourth value, the first format is a long truncated BSR format. For example, the fourth value is a quantity of bits occupied when a quantity of LCGs reported by using the BSR in the medium BSR format is equal to the second value.

When the quantity of padding bits is less than the fourth value and greater than a third value, the first format is a medium truncated BSR format. For example, the third value is determined based on a size of the BSR in the first format and a size of a MAC subheader of the BSR in the first format. For example, the third value may be specifically a quantity of bits occupied when the BSR in the first format reports a buffer data volume of one LCG plus a quantity of bits occupied by the MAC subheader in the first format. That is, the third value is a smallest quantity of bits required for sending the BSR in the first format by the communication apparatus.

When the quantity of padding bits is equal to the third value, the first format is a short truncated BSR format. When the quantity of padding bits is equal to the third value, the communication apparatus can report a buffer data volume of only one LCG. Therefore, the first format is the short truncated BSR format, to notify the network device that in addition to the LCG reported by using the BSR, another LCG of the communication apparatus has buffered data. A BSR in the short truncated BSR format is used to report a buffer data volume of a high-priority LCG in the LCGs having buffered data.

When the quantity of padding bits is less than the third value, the communication apparatus determines the second format as the target BSR format. When the quantity of LCGs having buffered data is greater than 1, the first identifier is greater than the first value, and the padding bits are insufficient to report the BSR in the first format, the BSR in the second format is used to report a buffer data volume of an LCG whose LCG identifier is less than the first value in the LCGs having buffered data.

Case 2: When the first identifier is greater than the first value and the quantity of LCGs having buffered data is less than the second value, the communication apparatus determines the specific format of the first format based on the quantity of padding bits.

The communication apparatus determines a size of the BSR in the medium BSR format and a size of a MAC subheader of the BSR in the medium BSR format. The quantity of padding bits is compared with the size of the BSR in the medium BSR format plus the size of the MAC subheader of the BSR in the medium BSR format. When the quantity of padding bits is greater than or equal to the size of the BSR in the medium BSR format plus the size of the MAC subheader of the BSR in the medium BSR format, the first format is the medium BSR format. When the quantity of padding bits is less than the size of the BSR in the medium BSR format plus the size of the MAC subheader of the BSR in the medium BSR format, and is greater than the third value, the first format is a medium truncated BSR format.

When the quantity of padding bits is equal to the third value, the first format is a short truncated BSR format.

When the quantity of padding bits is less than the third value, the communication apparatus determines the second format as the target BSR format.

Case 3: When the first identifier is greater than the first value, and the quantity of LCGs having buffered data is 1, the communication apparatus determines a size of the BSR in the short BSR format and a size of a MAC subheader of the BSR in the short BSR format. When the quantity of padding bits is greater than or equal to the third value, the first format is the short BSR format. When the quantity of padding bits is less than the third value, the second format is determined as the target BSR format. The third value is the size of the BSR in the short BSR format plus the size of the MAC subheader of the BSR in the short BSR format.

In this embodiment of this application, for the padding BSR, the communication apparatus may further determine the specific format of the first format based on the quantity of padding bits, to ensure that the communication apparatus can report the generated BSR in the first format by using the padding bits.

In another implementation, the communication apparatus may further determine a specific format of the second format based on the quantity of padding bits. That the communication apparatus determines a specific format of the second format based on the quantity of padding bits may include the following several cases.

Case 1: When the first identifier is less than or equal to the first value and the quantity of LCGs having buffered data is greater than or equal to the second value, the communication apparatus determines the specific format of the second format based on the quantity of padding bits.

The communication apparatus determines a quantity of bits occupied by the BSR in the long BSR format. When the quantity of padding bits is greater than or equal to the size of the BSR in the long BSR format plus the size of the MAC subheader of the BSR in the long BSR format, the second format is the long BSR format.

When the quantity of padding bits is less than the size of the BSR in the long BSR format plus the size of the MAC subheader of the BSR in the long BSR format, and the quantity of padding bits is greater than or equal to a seventh value, the second format is the long truncated BSR format. For example, the seventh value is a quantity of bits occupied when a quantity of LCGs reported by using the BSR in the medium BSR format is equal to the second value.

When the quantity of padding bits is less than the seventh value and greater than a fifth value, the second format is the medium truncated BSR format. The fifth value is determined based on the sizes of the BSR in the short BSR format and the MAC subheader of the BSR in the short BSR format. For example, the fifth value may be specifically the size of the BSR in the short BSR format plus the size of the MAC subheader of the BSR in the short BSR format. That is, the fifth value is a quantity of bits required for reporting the BSR in the short BSR format.

When the quantity of padding bits is equal to the fifth value, the second format is the short truncated BSR format. When the quantity of padding bits is less than the fifth value, the communication apparatus can report a buffer data volume of only one LCG by using the short truncated BSR format. A BSR in the short truncated BSR format is used to report a buffer data volume of one high-priority LCG in the LCGs having buffered data.

Case 2: When the first identifier is less than or equal to the first value and the quantity of LCGs having buffered data is less than the second value, the communication apparatus determines the specific format of the second format based on the quantity of padding bits.

The communication apparatus determines the size of the BSR in the medium BSR format and the size of the MAC subheader of the BSR in the medium BSR format. The quantity of padding bits is compared with the size of the BSR in the medium BSR format plus the size of the MAC subheader of the BSR in the medium BSR format. When the quantity of padding bits is greater than or equal to the size of the BSR in the medium BSR format plus the size of the MAC subheader of the BSR in the medium BSR format, the second format is the medium BSR format. When the quantity of padding bits is less than the size of the BSR in the medium BSR format plus the size of the MAC subheader of the BSR in the medium BSR format and is greater than the fifth value, the second format is the medium truncated BSR format.

When the quantity of padding bits is equal to the fifth value, the second format is a regular short truncated BSR format.

Case 3: When the first identifier is less than or equal to the first value and the quantity of LCGs having buffered data is 1, the second format is the short BSR format.

In this embodiment of this application, for the padding BSR, the communication apparatus may further determine the specific format of the second format based on the quantity of padding bits, to ensure that the communication apparatus can report the generated BSR in the second format by using the padding bits.

Implementation 2:

The target BSR format is determined based on the result of comparison between the first identifier and the first value and a result of comparison between the quantity of padding bits and a third value.

For example, the third value may be determined based on BSR sizes corresponding to a plurality of BSR formats that can be used by the communication apparatus. For example, the third value may be specifically a size of a BSR in one of the plurality of BSR formats plus a size of a MAC subheader corresponding to the BSR. That is, the third value is a smallest quantity of bits required for reporting the BSR in the BSR format by the communication apparatus.

For the padding BSR, the communication apparatus may determine, from the plurality of BSR formats based on the result of comparison between the first identifier and the first value and the result of comparison between the quantity of padding bits and the third value, the target BSR format used for reporting the BSR. There are at least two different BSR formats in the plurality of BSR formats, and largest values of LCG identifiers of LCGs that can be reported by using BSRs in the two BSR formats are different. When a same quantity of LCGs are reported, sizes of BSRs in the two BSR formats are different. Therefore, the communication apparatus can determine, based on the result of comparison between the first identifier and the first value and the result of comparison between the quantity of padding bits and the third value, the target BSR format used for reporting the BSR.

In an implementation, the determining the target BSR format based on the result of comparison between the first identifier and the first value and the result of comparison between the quantity of padding bits and the third value includes the following steps:

- when the first identifier is greater than the first value and the quantity of padding bits is greater than or equal to the third value, determining the first format as the target BSR format;
- when the first identifier is greater than the first value and the quantity of padding bits is less than the third value, determining the second format as the target BSR format, where a BSR in the second format is used to report a buffer data volume of an LCG whose LCG identifier is less than the first value in the LCGs having buffered data; or
- when the first identifier is less than or equal to the first value, determining the second format as the target BSR format.

The plurality of BSR formats may include the first format and the second format. The plurality of BSR formats may include the first format and the second format, and identifier ranges of LCGs that can be reported by using the BSR in the first format and the BSR in the second format are different. The BSR in the first format is used to report a buffer data volume of an LCG whose LCG identifier is within a first identifier threshold, and the BSR in the second format is used to report a buffer data volume of an LCG whose LCG identifier is within a second identifier threshold. The first identifier threshold is greater than the second identifier threshold. When buffer data volumes of a same quantity of LCGs are reported, a quantity of bits occupied by the BSR in the first format is greater than a quantity of bits occupied by the BSR in the second format. The communication apparatus needs to send the BSR by using padding bits. Therefore, the communication apparatus needs to determine that a sum of a size of the BSR generated based on the target BSR format and a size of a MAC subheader of the BSR is less than or equal to a quantity of padding bits, to ensure that the BSR can be sent by using the padding bits. Therefore, the communication apparatus can determine the target BSR format from the first format and the second format based on the result of comparison between the first identifier and the first value and the result of comparison between the quantity of padding bits and the third value.

For example, the first value may be equal to a largest LCG identifier in LCG identifiers of LCGs that can be reported by using the BSR in the second format. That is, the first value may be equal to the second identifier threshold. The BSR in the second format cannot report an LCG whose LCG identifier is greater than the first value.

For example, the third value is determined based on a size of the BSR in the first format and a size of a MAC subheader of the BSR in the first format. For example, the third value may be specifically a quantity of bits required for reporting a buffer data volume of one LCG by using the BSR in the first format. That is, the third value is a smallest quantity of bits required for reporting the BSR in the first format. When the first identifier is greater than the first value and the quantity of padding bits is greater than or equal to the third value, the communication apparatus can send the BSR in the first format by using the padding bits. Therefore, the first format is determined as the target BSR format, and the BSR in the first format is used to report buffer data volumes of a part or all of the LCGs having buffered data. When the first identifier is greater than the first value and the quantity of padding bits is less than the third value, the padding bits are insufficient to send the BSR in the first format. Therefore, the communication apparatus determines the second format as the target BSR format, and reports, by using the BSR in the second format, a buffer data volume of an LCG whose identifier is less than or equal to the first value in the LCGs having buffered data. When the first identifier is less than or equal to the first value, the communication apparatus determines the second format as the target BSR format, and reports buffer data volumes of a part or all of the LCGs having buffered data by using the BSR in the second format.

In an implementation, when the first identifier is greater than the first value and the quantity of padding bits is greater than or equal to the third value, an LCG identifier of a high-priority LCG in the LCGs having the buffered data is determined. When the LCG identifier of the high-priority LCG is less than or equal to the first value, a format that is in the first format and the second format and in which a larger quantity of LCGs can be reported is determined as the target BSR format. When a quantity of LCGs whose LCG identifiers are less than or equal to the first value in the LCGs having buffered data is greater than a quantity of LCGs that can be reported by using the BSR in the first format, the second format is determined as the target format; or when the quantity of LCGs whose LCG identifiers are less than or equal to the first value in the LCGs having buffered data is less than the quantity of LCGs that can be reported by using the BSR in the first format, the first format is determined as the target BSR format.

In an implementation, the communication apparatus may determine a specific format of the first format based on the quantity of padding bits. When the quantity of padding bits is equal to the third value, the first format is a short BSR format; when the quantity of padding bits is greater than the third value and less than a fourth value, the first format is a medium BSR format; or when the quantity of padding bits is greater than the fourth value, the first format is a long BSR format.

When the first format is the long BSR format, the BSR in the first format is used to report a buffer data volume of an LCG whose LCG identifier is within the first identifier threshold. The BSR in the first format includes a first bitmap. Each bit in the first bitmap indicates whether each of at least one LCG has buffered data, or indicates whether a buffer size BS field corresponding to each of the at least one LCG exists. An LCG identifier of the at least one LCG is within the first identifier threshold. For example, when the first format is the long BSR format, the first format may be the extended long BSR format shown in FIG. 7. The long BSR format may also be understood as a long truncated BSR format. When the padding bits are insufficient to report the buffer data volumes of all the LCGs having buffered data, the first format is the long truncated BSR format.

When the first format is the short BSR format, the BSR in the first format is used to report a buffer data volume of one LCG whose LCG identifier is within the first identifier threshold. The BSR in the first format includes a first LCGID field, and the first LCGID field indicates an identifier of the LCG. For example, when the first format is the short BSR format, the first format may be the extended short BSR format shown in FIG. 6. The short BSR format may also be understood as a short truncated BSR format. When the padding bits are insufficient to report the buffer data volumes of all the LCGs having buffered data, the first format is the short truncated BSR format.

When the first format is the medium BSR format, the BSR in the first format is used to report a buffer data volume of an LCG whose LCG identifier is within the first identifier threshold. The BSR in the first format includes an LCG identifier of at least one LCG and indication information that indicates a buffer data volume of the at least one LCG. The at least one LCG is at least one LCG in the LCGs having buffered data. For example, when the first format is the medium BSR format, the first format may be the medium BSR format shown in FIG. 8A or FIG. 8B. The medium BSR format may also be understood as a medium truncated BSR format. When the padding bits are insufficient to report the buffer data volumes of all the LCGs having buffered data, the first format is the medium truncated BSR format.

The fourth value may be a quantity of bits occupied by a BSR in the long BSR format or a BSR in the medium BSR format when quantities of LCGs reported by using the BSR in the long BSR format and the BSR in the medium BSR format are the same and quantities of bits occupied by the BSR in the long BSR format and the BSR in the medium BSR format are the same. That is, when both the quantity of bits occupied by the BSR in the long BSR format and the quantity of bits occupied by the BSR in the medium BSR format are the fourth value, the BSR in the long BSR and the BSR in the medium BSR can report a same quantity of LCGs. When the quantity of bits occupied by the BSR in the medium BSR format and the quantity of bits occupied by the BSR in the long BSR format are the same and are both less than the fourth value, the quantity of LCGs that can be reported by using the BSR in the medium BSR format is greater than the quantity of LCGs that can be reported by using the BSR in the long BSR format. When the quantity of bits occupied by the BSR in the medium BSR format and the quantity of bits occupied by the BSR in the long BSR format are the same and are both greater than the fourth value, the quantity of LCGs that can be reported by using the BSR in the medium BSR format is less than the quantity of LCGs that can be reported by using the BSR in the long BSR format. When the quantity of padding bits is greater than or equal to the third value and less than the fourth value, and the quantity of LCGs that can be reported by using the BSR in the medium BSR format is greater than the quantity of LCGs that can be reported by using the BSR in the long BSR format, the communication apparatus determines the medium BSR format as the target BSR format. When the quantity of padding bits is greater than or equal to the fourth value, and the quantity of LCGs that can be reported by using the BSR in the long BSR format is greater than the quantity of LCGs that can be reported by using the BSR in the medium BSR format, the communication apparatus determines the long BSR format as the target BSR format.

In this embodiment of this application, a specific format of the first format is determined based on the quantity of padding bits, and a proper BSR format is selected for reporting, so that buffer data volumes of more LCGs can be reported.

In an implementation, the communication apparatus may determine the specific format of the first format based on the quantity of LCGs having buffered data. That the communication apparatus determines the specific format of the first format based on the quantity of LCGs having buffered data may include the following several cases:

Case 1: When the first identifier is greater than the first value and the quantity of padding bits is equal to the third value, the communication apparatus may determine the specific format of the first format based on the quantity of LCGs having buffered data.

When the quantity of LCGs having buffered data is 1, the first format is the short BSR format. When the quantity of LCGs having buffered data is greater than 1, the first format is the short truncated BSR format.

Case 2: When the first identifier is greater than the first value and the quantity of padding bits is greater than the third value and is less than or equal to the fourth value, the communication apparatus may determine the specific format of the first format based on the quantity of LCGs having buffered data.

When the quantity of LCGs having buffered data is less than or equal to an eighth value, the first format is the medium BSR format. When the quantity of LCGs having buffered data is less than the eighth value, the first format is the medium truncated BSR format. The eighth value is a quantity of LCGs that can be reported by using a BSR in the medium BSR format when the quantity of bits occupied by the BSR in the medium BSR format is less than or equal to the quantity of padding bits.

In an implementation, to save resources, when the quantity of LCGs having buffered data is 1, the first format may be the short BSR format.

Case 3: When the first identifier is greater than the first value and the quantity of padding bits is greater than or equal to the fourth value, the communication apparatus may further determine the specific format of the first format based on the quantity of LCGs having buffered data.

When the quantity of LCGs having buffered data is less than or equal to a ninth value, the first format is the long BSR format. When the quantity of LCGs having buffered data is greater than the ninth value, the first format is the long truncated BSR format. The ninth value is a quantity of LCGs that can be reported by using a BSR in the long BSR format when the quantity of bits occupied by the BSR in the long BSR format is less than or equal to the quantity of padding bits.

In an implementation, to save resources, when the quantity of LCGs having buffered data is 1, the first format may be the short BSR format. When the quantity of LCGs having buffered data is greater than 1 and less than a second value, the first format is the medium BSR format. When the quantity of LCGs having buffered data is greater than the second value, the first format is the long BSR format or the long truncated BSR format. When the padding bits are insufficient to report the buffer data volumes of all the LCGs having buffered data, the first format is the long truncated BSR format. A BSR in the long truncated BSR format is used to report buffer data volumes of a part of the LCGs having buffered data. Some LCGs reported by using the BSR in the long truncated BSR format are some high-priority LCGs in the LCGs having buffered data.

In an implementation, the communication apparatus may determine a specific format of the second format based on the quantity of padding bits. When the quantity of padding bits is equal to a fifth value, the second format is the short BSR format. When the quantity of padding bits is greater than the fifth value, the second format is the long BSR format.

When the second format is the short BSR format, the BSR in the second format is used to report a buffer data volume of one LCG whose LCG identifier is within the second identifier threshold. The BSR in the second format includes a second LCGID field, and the second LCGID field indicates an identifier of the LCG. When both the first format and the second format are short BSR formats, a quantity of bits of the BSR in the first format is greater than a quantity of bits of the BSR in the second format. A quantity of bits of the first LCGID field is greater than a quantity of bits of the second LCGID. For example, when the second format is the short BSR format, the second format may be the regular short BSR format shown in FIG. 4. The short BSR format may also be understood as a short truncated BSR format. When the quantity of padding bits is less than the fifth value, and the padding bits are insufficient to report buffer data volumes of all the LCGs having buffered data, the second format is the short truncated BSR format.

When the second format is the long BSR format, the BSR in the second format is used to report a buffer data volume of an LCG whose LCG identifier is within the second identifier threshold. The BSR in the second format includes a second bitmap. Each bit in the second bitmap indicates whether each of at least one LCG has buffered data, or indicates whether a buffer size BS field corresponding to each of the at least one LCG exists. An LCG identifier of the at least one LCG is within the second identifier threshold. A quantity of bits of the second bitmap is less than a quantity of bits of the first bitmap. For example, when the second format is the long BSR format, the second format may be the regular long BSR format shown in FIG. 5. The long BSR format may also be understood as the long truncated BSR format. When the padding bits are insufficient to report the buffer data volumes of all the LCGs having buffered data, the second format is the long truncated BSR format.

In an implementation, the communication apparatus may determine the specific format of the second format based on the quantity of LCGs having buffered data. That the communication apparatus determines the specific format of the second format based on the quantity of LCGs having buffered data may include the following several cases:

Case 1: When the first identifier is less than or equal to the first value and the quantity of padding bits is less than the fifth value, the communication apparatus may determine the specific format of the second format based on the quantity of LCGs having buffered data.

When the quantity of LCGs having buffered data is 1, the second format is the short BSR format. When the quantity of LCGs having buffered data is greater than 1, the second format is the short truncated BSR format.

Case 2: When the first identifier is less than or equal to the first value and the quantity of padding bits is greater than or equal to the fifth value, the communication apparatus may determine the specific format of the second format based on the quantity of LCGs having buffered data.

When the quantity of LCGs having buffered data is less than or equal to a tenth value, the second format is the long BSR format. When the quantity of LCGs having buffered data is greater than the tenth value, the second format is the long truncated BSR format. The tenth value is a quantity of LCGs that can be reported by using a BSR in the long BSR format when the quantity of bits occupied by the BSR in the long BSR format is less than or equal to the quantity of padding bits.

In an implementation, to save resources, when the quantity of LCGs having buffered data is 1, the second format may be the short BSR format.

In this implementation, the target BSR format is determined based on the result of comparison between the first identifier and the first value and the result of comparison between the quantity of padding bits and the third value, to select a proper BSR format to report a buffer data volume of an LCG having buffered data. In this way, an uplink resource can be properly used to report a BSR, and refined scheduling of a network resource is implemented.

Implementation 3:

The target BSR format is determined based on the result of comparison between the first identifier and the first value and the quantity of LCGs having buffered data.

For example, there are at least two different BSR formats in the plurality of BSR formats. Largest values of LCG identifiers of LCGs that can be reported by using BSRs in the two BSR formats are different, and quantities of LCGs that can be reported are also different. The communication apparatus may determine the target BSR format based on the result of comparison between the first identifier and the first value and a quantity of padding bits.

For example, the plurality of BSR formats include a first BSR format, a largest value of LCG identifiers of LCGs that can be reported in the first BSR format is 7, a quantity of LCGs that can be reported is 8, a quantity of LCGs having buffered data is 3, and a largest LCG identifier in LCG identifiers of the LCGs having buffered data is 5. The communication apparatus determines the first BSR format as the target BSR format.

In an implementation, that the target BSR format is determined based on the result of comparison between the first identifier and the first value and the quantity of LCGs having buffered data includes the following steps:

when the first identifier is greater than the first value and the quantity of LCGs having buffered data is 1, determining a first short BSR format as the target BSR format;

when the first identifier is greater than the first value and the quantity of LCGs having buffered data is greater than 1 and less than a second value, determining a medium BSR format as the target BSR format;

when the first identifier is greater than the first value and the quantity of LCGs having buffered data is greater than or equal to the second value, determining a first long BSR format as the target BSR format;

when the first identifier is less than or equal to the first value and the quantity of LCGs having buffered data is 1, determining a second short BSR format as the target BSR format; or when the first identifier is less than or equal to the first value and the quantity of LCGs having buffered data is greater than 1, determining a second long BSR format as the target BSR format.

The plurality of BSR formats may include the first long BSR format, the first short BSR format, the medium BSR format, the second long BSR format, and the second short BSR format.

A BSR in the first long BSR format is used to report a buffer data volume of an LCG whose LCG identifier is within a first identifier threshold. The BSR in the first long BSR format includes a first bitmap. Each bit in the first bitmap indicates whether each of at least one LCG has buffered data, or indicates whether a buffer size BS field corresponding to each of the at least one LCG exists. An LCG identifier of the at least one LCG is within the first identifier threshold. For example, the first long BSR format may be the extended long BSR format shown in FIG. 7.

A BSR in the second long BSR format is used to report a buffer data volume of an LCG whose LCG identifier is within a second identifier threshold. The BSR in the second long BSR format includes a second bitmap. Each bit in the second bitmap indicates whether each of at least one LCG has buffered data, or indicates whether a buffer size BS field corresponding to each of the at least one LCG exists. An LCG identifier of the at least one LCG is within the second identifier threshold. The first identifier threshold is greater than the second identifier threshold, and a quantity of bits of the first bitmap is greater than a quantity of bits of the second bitmap. For example, the second long BSR format may be the regular long BSR format shown in FIG. 5.

A BSR in the first short BSR format is used to report a buffer data volume of one LCG whose LCG identifier is within the first identifier threshold. The BSR in the first short BSR format includes a first LCGID field, and the first LCGID field indicates an identifier of the LCG. For example, the first short BSR format may be the extended short BSR format shown in FIG. 6.

A BSR in the second short BSR format is used to report a buffer data volume of one LCG whose LCG identifier is within the second identifier threshold. The BSR in the second short BSR format includes a second LCGID field, and the second LCGID field indicates an identifier of the LCG. A quantity of bits of the first LCGID field is greater than a quantity of bits of the second LCGID. For example, the second short BSR format may be the regular short BSR format shown in FIG. 4.

A BSR in the medium BSR format is used to report a buffer data volume of an LCG whose LCG identifier is within the first identifier threshold. The BSR in the medium BSR format includes an LCG identifier of at least one LCG and indication information that indicates a buffer data volume of the at least one LCG. The at least one LCG is at least one LCG in the LCGs having buffered data. For example, the medium BSR format may be the medium BSR format shown in FIG. 8A or FIG. 8B.

The first value may be equal to the second identifier threshold. When the first identifier is less than or equal to the first value, the communication apparatus may report, by using the BSR in the second long BSR format or the BSR in the second short BSR format, buffer data volumes of a part or all of the LCGs having buffered data. When the first identifier is greater than the first value, the communication apparatus may report, by using the BSR in the first long BSR format, the BSR in the first short BSR format, or the BSR in the medium BSR format, buffer data volumes of a part or all of the LCGs having buffered data.

The second value may be determined based on the quantity of octets occupied by the first bitmap in the first long BSR format. The second value may be specifically the quantity of octets occupied by the first bitmap in the long BSR format. When reporting the BSR in the first long BSR format, the communication apparatus needs to report a bitmap, and the bitmap occupies a quantity of bits. When a quantity of LCGs that need to be reported is less than a quantity of octets occupied by the bitmap, a resource waste is caused. Therefore, when the quantity of LCGs that need to be reported is less than the quantity of octets occupied by the bitmap, the communication apparatus reports, by using the BSR in the medium BSR format, a buffer data volume of an LCG having buffered data, so that resources can be saved and resources can be properly used.

In an implementation, the communication apparatus may further determine the target BSR format based on the quantity of padding bits. That the communication apparatus determines the target BSR format based on the quantity of padding bits may include the following several cases.

Case 1: When the first identifier is greater than the first value and the quantity of LCGs having buffered data is 1, the communication apparatus may determine the target BSR format based on the quantity of padding bits.

When the quantity of padding bits is greater than or equal to a third value, the first short BSR format is determined as the target BSR format.

When the quantity of padding bits is less than the third value, it indicates that the padding bits are insufficient to report the BSR in the first short BSR format, and the communication apparatus does not report the BSR to the network device. For example, the third value is determined based on a size of the BSR in the first short BSR format and a size of a MAC subheader of the BSR in the first short BSR format. For example, the third value may be specifically a quantity of bits occupied by the first short BSR format.

Case 2: When the first identifier is greater than the first value and the quantity of LCGs having buffered data is greater than 1 and less than a second value, the communication apparatus may determine the target BSR format based on the quantity of padding bits.

When the quantity of padding bits is less than the third value, whether the LCGs having buffered data include an LCG whose LCG identifier is less than or equal to the first value is determined, and if there is an LCG whose LCG identifier is less than or equal to the first value in the LCGs having buffered data, a second short truncated BSR format is determined as the target BSR format. A BSR in the second short truncated BSR format is used to report a buffer data volume of one LCG whose LCG identifier is less than or equal to the first value in the LCGs having buffered data.

When the quantity of padding bits is equal to the third value, a first short truncated BSR format is determined as the target BSR format. A BSR in the first short truncated BSR format is used to report a buffer data volume of one high-priority LCG in the LCGs having buffered data.

When the quantity of padding bits is greater than the third value, the medium BSR format or a medium truncated BSR format is determined as the target BSR format. When the padding bits are sufficient to report buffer data volumes of all the LCGs having buffered data, the medium BSR format is determined as the target BSR format. When the padding bits are insufficient to report buffer data volumes of all the LCGs having buffered data, the medium truncated BSR format is determined as the target BSR format. A BSR in the medium truncated BSR format is used to report a buffer data volume of a high-priority LCG in the LCGs having buffered data.

Case 3: When the first identifier is greater than the first value and the quantity of LCGs having buffered data is greater than or equal to the second value, the communication apparatus may determine the target BSR format based on the quantity of padding bits.

When the quantity of padding bits is less than the third value, whether the LCGs having buffered data include an LCG whose LCG identifier is less than or equal to the first value is determined, and if there is an LCG whose LCG identifier is less than or equal to the first value in the LCGs having buffered data, a second short truncated BSR format is determined as the target BSR format. A BSR in the second short truncated BSR format is used to report a buffer data volume of one LCG whose LCG identifier is less than or equal to the first value in the LCGs having buffered data.

When the quantity of padding bits is equal to the third value, the first short truncated BSR format is determined as the target BSR format. The BSR in the first short truncated BSR format is used to report a buffer data volume of one high-priority LCG in the LCGs having buffered data.

When the quantity of padding bits is greater than the third value and less than a fourth value, the medium truncated BSR format is determined as the target BSR format.

When the quantity of padding bits is greater than or equal to the third value, the first long BSR format or a first long truncated BSR format is determined as the target BSR format. When the padding bits are sufficient to report buffer data volumes of all the LCGs having buffered data, the first long BSR format is determined as the target BSR format. When the padding bits are insufficient to report buffer data volumes of all the LCGs having buffered data, the first long truncated BSR format is determined as the target BSR format. A BSR in the first long truncated BSR format is used to report a buffer data volume of a high-priority LCG in the LCGs having buffered data. For example, the fourth value may be a quantity of bits occupied when a quantity of LCGs reported by using the BSR in the medium BSR format is equal to the second value.

Case 4: When the first identifier is less than or equal to the first value and the quantity of LCGs having buffered data is greater than 1, the communication apparatus may determine the target BSR format based on the quantity of padding bits.

When the quantity of padding bits is equal to a fifth value, the second short truncated BSR format is determined as the target BSR format. The BSR in the second short truncated BSR format is used to report a buffer data volume of one highest-priority LCG in the LCGs having buffered data.

When the quantity of padding bits is greater than or equal to the fifth value, the second long BSR format or a second long truncated BSR format is determined as the target BSR format. When the padding bits are sufficient to report buffer data volumes of all the LCGs having buffered data, the second long BSR format is determined as the target BSR format. When the padding bits are insufficient to report buffer data volumes of all the LCGs having buffered data, the second long truncated BSR format is determined as the target BSR format. A BSR in the second long truncated BSR format is used to report a buffer data volume of a high-priority LCG in the LCGs having buffered data. For example, the fifth value may be determined based on a size of the BSR in the second short BSR format and a size of a MAC subheader of the BSR in the second short BSR format. For example, the fifth value may be specifically equal to the size of the BSR in the second short BSR format plus the size of the MAC subheader of the BSR in the second short BSR format. That is, the fifth value is a quantity of bits required for reporting the BSR in the second short BSR format.

In this implementation, the target BSR format is determined based on the result of the comparison between the first identifier and the first value and the quantity of LCGs having buffered data, to select a proper BSR format to report a buffer data volume of an LCG having buffered data. In this way, an uplink resource can be properly used to report a BSR, and refined scheduling of a network resource is implemented.

Implementation 4:

The target BSR format is determined based on the result of comparison between the first identifier and the first value, the quantity of LCGs having buffered data, and a quantity of padding bits.

For example, for a padding BSR, the communication apparatus may determine, from a plurality of BSR formats based on the result of comparison between the first identifier and the first value, the quantity of LCGs having buffered data, and the quantity of padding bits, the target BSR format used for reporting a BSR. There are at least two different BSR formats in the plurality of BSR formats. Largest values of LCG identifiers of LCGs that can be reported by using BSRs in the two BSR formats are different, and quantities of LCGs that can be reported are also different. When a same quantity of LCGs are reported, quantities of bits occupied by BSRs in the two BSR formats are also different. Therefore, the communication apparatus can determine, based on the result of comparison between the first identifier and the first value, the quantity of LCGs having buffered data, and a result of comparison between the quantity of padding bits and a third value, the target BSR format used for reporting the BSR.

For example, the communication apparatus may compare the quantity of LCGs having buffered data with a quantity of LCGs that can be reported by using a BSR in any one of the plurality of BSR formats, compare the first identifier with a largest value of LCG identifiers of LCGs that can be reported by using a BSR in any one of the plurality of BSR formats, and compare the padding bits with a quantity of bits occupied by a BSR in any one of the plurality of BSR formats, to determine the target BSR format that matches the LCG having buffered data, so that a BSR in the target BSR format can report buffer data volumes of a part or all of the LCGs having buffered data.

For example, the plurality of BSR formats include a first BSR format, a largest value of LCG identifiers of LCGs that can be reported in the first BSR format is 7, a quantity of LCGs that can be reported is 8, and a smallest quantity of bits required for reporting in the first BSR format is 2 octets. When the quantity of LCGs having buffered data is 3, a largest LCG identifier in LCG identifiers of the LCGs having buffered data is 5, and the quantity of padding bits is 8 octets, the first BSR format matches the LCG having buffered data. Therefore, the first BSR format is determined as the target BSR format.

In an implementation, the determining the target BSR format based on the result of comparison between the first identifier and the first value, the quantity of LCGs having buffered data, and a quantity of padding bits may include the following steps:

when the first identifier is greater than the first value, the quantity of LCGs having buffered data is 1, and the quantity of padding bits is greater than or equal to a third value, determining a first short BSR format as the target BSR format;

when the first identifier is greater than the first value, the quantity of LCGs having buffered data is greater than 1, and the quantity of padding bits is equal to the third value, determining the first short BSR format as the target BSR format;

when the first identifier is greater than the first value, the quantity of LCGs having buffered data is greater than 1, and the quantity of padding bits is less than the third value, determining a second short BSR format as the target BSR format, where a BSR in the second short BSR format is used to report a buffer data volume of an LCG whose LCG identifier is less than the first value in the LCGs having buffered data;

when the first identifier is greater than the first value, the quantity of LCGs having buffered data is greater than 1, and the quantity of padding bits is greater than the third value and less than a fourth value, determining a medium BSR format as the target BSR format;

when the first identifier is greater than the first value, the quantity of LCGs having buffered data is greater than 1 and less than a second value, and the quantity of padding bits is greater than the fourth value, determining the medium BSR format as the target BSR format;

when the first identifier is greater than the first value, the quantity of LCGs having buffered data is greater than or equal to the second value, and the quantity of padding bits is greater than the fourth value, determining a first long BSR format as the target BSR format;

when the first identifier is less than or equal to the first value and the quantity of LCGs having buffered data is 1, determining the second short BSR format as the target BSR format;

when the first identifier is less than or equal to the first value, the quantity of LCGs having buffered data is greater than 1, and the quantity of padding bits is equal to a fifth value, determining the second short BSR format as the target BSR format; or when the first identifier is less than or equal to the first value, the quantity of LCGs having buffered data is greater than 1, and the quantity of padding bits is greater than the fifth value, determining a second long BSR format as the target BSR format.

The plurality of BSR formats may include the first long BSR format, the first short BSR format, the medium BSR format, the second long BSR format, and the second short BSR format.

A BSR in the first long BSR format is used to report a buffer data volume of an LCG whose LCG identifier is within a first identifier threshold. The BSR in the first long BSR format includes a first bitmap. Each bit in the first bitmap indicates whether each of at least one LCG has buffered data, or indicates whether a buffer size BS field corresponding to each of the at least one LCG exists. An LCG identifier of the at least one LCG is within the first identifier threshold. For example, the first long BSR format may be the extended long BSR format shown in FIG. 7.

A BSR in the second long BSR format is used to report a buffer data volume of an LCG whose LCG identifier is within a second identifier threshold. The BSR in the second long BSR format includes a second bitmap. Each bit in the second bitmap indicates whether each of at least one LCG has buffered data, or indicates whether a buffer size BS field corresponding to each of the at least one LCG exists. An LCG identifier of the at least one LCG is within the second identifier threshold. The first identifier threshold is greater than the second identifier threshold, and a quantity of bits of the first bitmap is greater than a quantity of bits of the second bitmap. For example, the second long BSR format may be the regular long BSR format shown in FIG. 5.

A BSR in the first short BSR format is used to report a buffer data volume of one LCG whose LCG identifier is within the first identifier threshold. The BSR in the first short BSR format includes a first LCGID field, and the first LCGID field indicates an identifier of the LCG. For example, the first short BSR format may be the extended short BSR format shown in FIG. 6.

A BSR in the second short BSR format is used to report a buffer data volume of one LCG whose LCG identifier is within the second identifier threshold. The BSR in the second short BSR format includes a second LCGID field, and the second LCGID field indicates an identifier of the LCG. A quantity of bits of the first LCGID field is greater than a quantity of bits of the second LCGID. For example, the second short BSR format may be the regular short BSR format shown in FIG. 4.

A BSR in the medium BSR format is used to report a buffer data volume of an LCG whose LCG identifier is within the first identifier threshold. The BSR in the medium BSR format includes an LCG identifier of at least one LCG and indication information that indicates a buffer data volume of the at least one LCG. The at least one LCG is at least one LCG in the LCGs having buffered data. For example, the medium BSR format may be the medium BSR format shown in FIG. 8A or FIG. 8B.

For example, the first value may be equal to the second identifier threshold. When the first identifier is less than or equal to the first value, the communication apparatus may report, by using the BSR in the second long BSR format or the BSR in the second short BSR format, buffer data volumes of a part or all of the LCGs having buffered data. When the first identifier is greater than the first value, the communication apparatus may report, by using the BSR in the first long BSR format, the BSR in the first short BSR format, or the BSR in the medium BSR format, buffer data volumes of a part or all of the LCGs having buffered data.

For example, the second value may be determined based on the quantity of octets occupied by the first bitmap in the first long BSR format. For example, the second value may be specifically the quantity of octets occupied by the first bitmap in the long BSR format.

For example, the third value is determined based on a size of the BSR in the first short BSR format and a size of a MAC subheader of the BSR in the first short BSR format. For example, the third value may be specifically a quantity of bits occupied by the first short BSR format.

For example, the fourth value is a quantity of bits occupied when a quantity of LCGs reported in the medium BSR format is equal to the second value.

For example, the fifth value is determined based on a size of the BSR in the second short BSR format and a size of a MAC subheader corresponding to the second short BSR format. For example, the fifth value may be specifically a quantity of bits occupied by the BSR in the second short BSR format plus a quantity of bits occupied by the MAC subheader of the BSR in the second short BSR format. That is, the fifth value is a quantity of bits required for reporting the BSR in the second short BSR format.

The first short BSR format may be further understood as a first short truncated BSR format, the first long BSR format may be further understood as a first long truncated BSR format, the medium BSR format may be further understood as a medium truncated BSR format, the second long BSR format may be further understood as a second long truncated BSR format, and the second short BSR format may be further understood as a second short truncated BSR format.

When the first identifier is greater than the first value, the quantity of LCGs having buffered data is 1, and the quantity of padding bits is greater than or equal to the third value, the first short BSR format is determined as the target BSR format.

When the first identifier is greater than the first value, the quantity of LCGs having buffered data is greater than 1, and the quantity of padding bits is equal to the third value, the first short truncated BSR format is determined as the target BSR format. A BSR in the first short truncated BSR format is used to report a buffer data volume of one highest-priority LCG in the LCGs having buffered data.

When the first identifier is greater than the first value, the quantity of LCGs having buffered data is greater than 1, and the quantity of padding bits is less than the third value, the padding bits are insufficient to send the BSR in the first format. Therefore, the second short truncated BSR format is determined as the target BSR format. A BSR in the second short truncated BSR format is used to report a buffer data volume of an LCG whose LCG identifier is less than the first value in the LCGs having buffered data.

When the first identifier is greater than the first value, the quantity of LCGs having buffered data is greater than 1, and the quantity of padding bits is greater than the third value and less than the fourth value, a size of the BSR in the medium BSR format and a size of a MAC subheader of the BSR in the medium BSR format are determined. If the quantity of padding bits is greater than or equal to the size of the BSR in the medium BSR format plus the size of the MAC subheader of the BSR in the medium BSR format, the medium BSR format is determined as the target BSR format. If the quantity of padding bits is less than the size of the BSR in the medium BSR format plus the size of the MAC subheader of the BSR in the medium BSR format, the medium truncated BSR format is determined as the target BSR format.

When the first identifier is greater than the first value, the quantity of LCGs having buffered data is greater than 1 and less than the second value, and the quantity of padding bits is greater than or equal to the fourth value, the medium BSR format is determined as the target BSR format.

When the first identifier is greater than the first value, the quantity of LCGs having buffered data is greater than or equal to the second value, and the quantity of padding bits is greater than or equal to the fourth value, a size of the BSR in the first long BSR format and a size of a MAC subheader of the BSR in the first long BSR format are determined. If the quantity of padding bits is greater than or equal to the size of the BSR in the first long BSR format plus the size of the MAC subheader of the BSR in the first long BSR format, the first long BSR format is determined as the target BSR format. If the quantity of padding bits is less than the size of the BSR in the first long BSR format plus the size of the MAC subheader of the BSR in the first long BSR format, the first long truncated BSR format is determined as the target BSR format.

When the first identifier is less than or equal to the first value and the quantity of LCGs having buffered data is 1, the second short BSR format is determined as the target BSR format.

When the first identifier is less than or equal to the first value, the quantity of LCGs having buffered data is greater than 1, and the quantity of padding bits is equal to the fifth value, the second short truncated BSR format is determined as the target BSR format.

When the first identifier is less than or equal to the first value, the quantity of LCGs having buffered data is greater than 1, and the quantity of padding bits is greater than the fifth value, a size of the BSR in the second long BSR format and a size of the MAC subheader of the BSR in the second long BSR format are determined. If the quantity of padding bits is greater than or equal to the size of the BSR in the second long BSR format plus the size of the MAC subheader of the BSR in the second long BSR format, the second long BSR format is determined as the target BSR format. If the quantity of padding bits is less than the size of the BSR in the second long BSR format plus the size of the MAC subheader of the BSR in the second long BSR format, the second long truncated BSR format is determined as the target BSR format.

The following uses an example in which the first long BSR format is an extended long BSR format, the first short BSR format is an extended short BSR format, the second long BSR format is a regular long BSR format, the second short BSR format is a regular short BSR format, the first value is 7, the first identifier threshold is 255, and the second identifier threshold is 7, to describe determining the target BSR format based on the result of comparison between the first identifier and the first value, the quantity of LCGs having buffered data, and the quantity of padding bits. When the quantity of padding bits is compared with a size of a BSR plus a size of MAC of the BSR, a size of a MAC subheader of the BSR needs to be considered. Therefore, for ease of description, the padding bits in the following cases may be understood as remaining bits after the size of the MAC subheader corresponding to the BSR is subtracted. Determining the target BSR format in different cases is specifically as follows:

When the quantity of LCGs having buffered data is 1, the first identifier is less than or equal to 7, and the quantity of padding bits is greater than or equal to 1 octet, the communication apparatus determines the regular short BSR format as the target BSR format.

When the quantity of LCGs having buffered data is 1, the first identifier is less than or equal to 7, and the quantity of padding bits is greater than or equal to 2 octets, the communication apparatus determines the regular short BSR format as the target BSR format. It should be understood that when the quantity of LCGs having buffered data is 1, the first identifier is less than or equal to 7, and the quantity of padding bits is greater than or equal to 2 octets, the communication apparatus may alternatively determine the extended short BSR format as the target BSR format.

When the quantity of LCGs having buffered data is 1, the first identifier is greater than 7, and the quantity of padding bits is greater than or equal to 2 octets, the communication apparatus determines the extended short BSR format as the target BSR format.

When the quantity of LCGs having buffered data is greater than 1, the first identifier is less than or equal to 7, and the quantity of padding bits is greater than or equal to 1 octet and less than 2 octets, the communication apparatus determines a regular short truncated BSR format as the target BSR format. A BSR in the regular short truncated BSR format is used to report a buffer data volume of a highest-priority LCG in the LCGs having buffered data.

When the quantity of LCGs having buffered data is greater than 1, the first identifier is less than or equal to 7, and the quantity of padding bits is equal to 2 octets, the communication apparatus determines a regular long truncated BSR format as the target BSR format. A BSR in the regular long truncated BSR format is used to report a buffer data volume of a highest-priority LCG in the LCGs having buffered data.

When the quantity of LCGs having buffered data is greater than 1, the first identifier is greater than 7, and the quantity of padding bits is equal to 2 octets, the communication apparatus determines an extended short truncated BSR format as the target BSR format. A BSR in the extended short truncated BSR format is used to report a buffer data volume of a highest-priority LCG in the LCGs having buffered data.

When the quantity of LCGs having buffered data is greater than 1, the first identifier is less than or equal to 7, and the quantity of padding bits is greater than 2 octets and less than 64 octets, the communication apparatus determines a size of a BSR in the regular long BSR format and a size of a MAC subheader of the BSR in the regular long BSR format. When the quantity of padding bits is greater than or equal to the size of the BSR in the regular long BSR format plus the size of the MAC subheader of the BSR in the regular long BSR format, the communication apparatus determines the regular long BSR format as the target BSR format. Otherwise, the communication apparatus determines the regular long truncated BSR format as the target BSR format.

When the quantity of LCGs having buffered data is greater than 1, the first identifier is greater than 7, and the quantity of padding bits is greater than 2 octets and less than or equal to 64 octets, the communication apparatus determines a size of the BSR in the medium BSR format and a size of a MAC subheader of the BSR in the medium BSR format. When the quantity of padding bits is greater than or equal to the size of the BSR in the medium BSR format plus the size of the MAC subheader of the BSR in the regular long BSR format, the communication apparatus determines the medium BSR format as the target BSR format. Otherwise, the communication apparatus determines the medium truncated BSR format as the target BSR format.

When the quantity of LCGs having buffered data is greater than 1, and the quantity of padding bits is greater than 9 and less than 16, if neither the BSR in the medium BSR format nor the BSR in the regular long BSR format can report all the LCGs having buffered data, the communication apparatus determines an LCG identifier of a high-priority LCG in the LCGs having buffered data, and when the LCG identifier of the high-priority LCG is less than 7, selects a format in which a larger quantity of LCGs can be reported from the medium truncated BSR format and the regular long BSR format, to report the BSR. When a quantity of LCGs whose LCG identifiers are less than 7 in the LCGs having buffered data is greater than a quantity of LCGs that can be reported in the medium truncated BSR format, the regular long BSR format is determined as the target BSR format. When a quantity of LCGs whose LCG identifiers are less than or equal to 7 in the LCGs having buffered data is less than a quantity of LCGs that can be reported in the medium truncated BSR format, the medium truncated BSR format is determined as the target BSR format. For example, it is assumed that the quantity of padding bits is 10, the BSR in the medium truncated BSR format may report buffer data volumes of five LCGs, a quantity of LCGs whose identifiers are less than 7 in the LCGs having buffered data is less than 5, and the BSR in the regular long BSR format can report only a buffer data volume of an LCG whose identifier is less than 7. Therefore, a quantity of LCGs that can be reported by using the BSR in the normal long BSR format is less than 5. In this case, the communication apparatus determines the medium BSR format as the target BSR format. If a quantity of LCGs identified in the LCGs having the buffered data is greater than 5, the communication apparatus determines the regular long BSR format as the target BSR format.

When the quantity of LCGs having buffered data is greater than 1, the first identifier is less than or equal to 7, and the quantity of padding bits is greater than 32 octets, the communication apparatus determines the regular long BSR format as the target BSR format.

When the first identifier is greater than 7, the quantity of LCGs having buffered data is greater than 1 and less than 32, and the quantity of padding bits is greater than 32 octets, the communication apparatus determines the medium BSR format as the target BSR format.

When the first identifier is greater than 7, the quantity of LCGs having buffered data is greater than or equal to 32, and the quantity of padding bits is greater than 32 octets, the communication apparatus determines the extended long BSR format or the extended long truncated BSR format as the target BSR format.

In this implementation, the target BSR format is determined based on the result of the comparison between the first identifier and the first value, the quantity of LCGs having buffered data, and the quantity of padding bits, to select a proper BSR format to report a buffer data volume of an LCG having buffered data. In this way, an uplink resource can be properly used to report a BSR, and refined scheduling of a network resource is implemented.

Figures 10, 11:
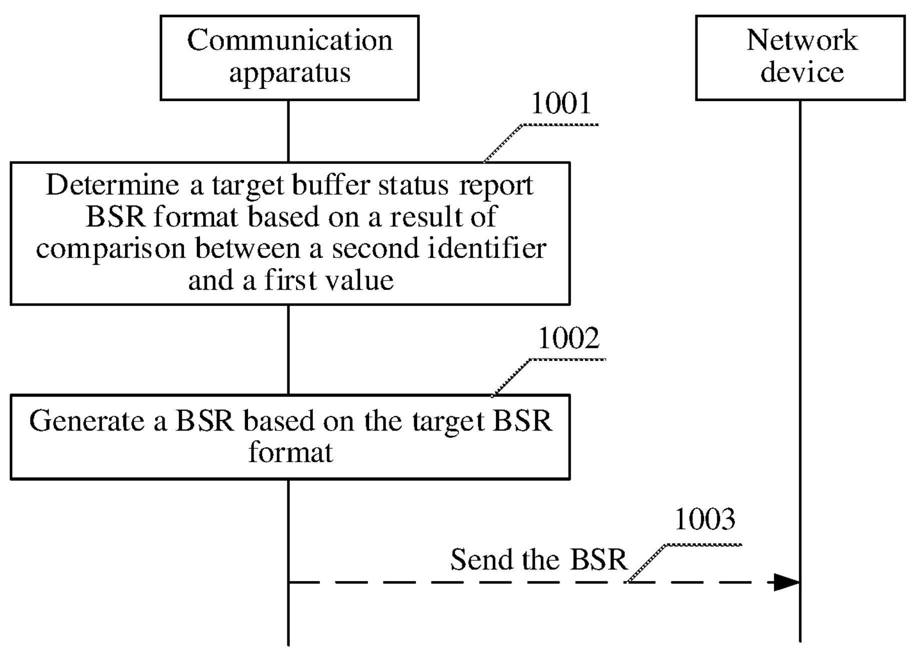
FIG. 10 is a schematic flowchart of another communication method according to an embodiment of this application.
FIG. 11 is a schematic flowchart of another communication method according to an embodiment of this application.

FIG. 10 is a schematic flowchart of another communication method according to an embodiment of this application. As shown in FIG. 10, the communication method includes but is not limited to the following steps.

1001: Determine a target buffer status report BSR format based on a result of comparison between a second identifier and a first value, where the second identifier is a largest LCG identifier in LCG identifiers of LCGs configured for a communication apparatus.

For example, the first value may be set by a network device, and the first value may be specifically 7.

The communication apparatus determines the target BSR format from a plurality of BSR formats based on the result of comparison between the second identifier and the first value. For example, there are at least two different BSR formats in the plurality of BSR formats, and largest values of LCG identifiers of LCGs that can be reported by using BSRs in the two BSR formats are different. Therefore, the communication apparatus can determine the target BSR format from the plurality of BSR formats based on the result of comparison between the secondidentifier and the first value. The BSRs in the two BSR formats occupy different quantities of bits to report a same quantity of LCGs.

For example, the first value may be equal to a largest value of LCG identifiers of LCGs that can be reported in one of the plurality of BSR formats. When the second identifier is less than or equal to the first value, the communication apparatus determines the BSR format as the target BSR format.

For example, the LCG of the communication apparatus is configured by the network device, and the network device configures a correspondence between an LCG and an LCH for the communication apparatus by using configuration information. The communication apparatus determines, based on the configuration information sent by the network device, LCGs that can be used by the communication apparatus.

In an implementation, the determining a target BSR format based on a result of comparison between a second identifier and a first value includes:

when the second identifier is greater than the first value, determining a first format as the target BSR format; or when the second identifier is less than or equal to the first value, determining a second format as the target BSR format.

A BSR in the first format is used to report a buffer data volume of an LCG whose LCG identifier is within a first identifier threshold, and a BSR in the second format is used to report a buffer data volume of an LCG whose LCG identifier is within a second identifier threshold. The first identifier threshold is greater than the second identifier threshold. The plurality of BSR formats may include the first format and the second format, and identifier ranges of LCG identifiers of LCGs that can be reported by using the BSR in the first format and the BSR in the second format are different. For example, the communication apparatus may determine, based on the first identifier, an identifier range to which an LCG identifier of an LCG that needs to be reported belongs, and determine the target BSR format corresponding to the identifier range.

For example, the first value may be equal to a largest value in LCG identifiers of LCGs that can be reported by using the BSR in the second format. That is, the first value may be equal to the second identifier threshold. The BSR in the second format cannot report an LCG whose LCG identifier is greater than the first value. When the second identifier is less than or equal to the first value, the second format is determined as the target BSR format. When the second identifier is greater than the first value, the first format is determined as the target BSR format.

For example, when buffer data volumes of a same quantity of LCGs are reported, a quantity of bits occupied by the BSR in the first format is greater than a quantity of bits occupied by the BSR in the second format. The BSR in the first format includes a first LCGID field or a first bitmap. The first LCGID field indicates an identifier of a reported LCG. Each bit in the first bitmap indicates whether each of at least one LCG has buffered data, or indicates whether a buffer size BS field corresponding to each of the at least one LCG exists. The BSR in the second format includes a second LCGID field or a second bitmap. The second LCGID field indicates an identifier of a reported LCG. Each bit in the second bitmap indicates whether each of at least one LCG has buffered data, or indicates whether a buffer size BS field corresponding to each of the at least one LCG exists. A quantity of bits of the first LCGID field is greater than a quantity of bits of the second LCGID field, and a quantity of bits of the first bitmap is greater than a quantity of bits of the second bitmap.

When the second identifier is greater than the first value, an LCG identifier of an LCG having buffered data is greater than the second identifier threshold, and the BSR in the second format cannot report a buffer data volume of an LCG whose LCG identifier is greater than the second identifier threshold. Therefore, the BSR in the first format is used to report a buffer data volume of an LCG configured for the communication apparatus. When the second identifier is less than or equal to the first value, an LCG identifier of an LCG configured for the communication apparatus is less than or equal to the second identifier threshold, and the BSR in the second format may be used to report a buffer data volume of the LCG configured for the communication apparatus. It should be understood that when the second identifier is less than or equal to the first value, the communication apparatus may alternatively use the BSR in the first format to report the buffer data volume of the LCG configured for the communication apparatus. When the second identifier is less than or equal to the first value, and buffer data volumes of a same quantity of LCG are reported, a quantity of bits occupied by the BSR in the first format is greater than a quantity of bits occupied by the BSR in the second format.

For example, the first identifier threshold may be 255, and the BSR in the first format may report an LCG whose LCG identifier is between 0 and 255. The second identifier threshold may be 7, and the BSR in the second format may report an LCG whose LCG identifier is between 0 and 7. The first format may include the extended short BSR format shown in FIG. 6, the extended long BSR format shown in FIG. 7, and the medium BSR format shown in FIG. 8A or FIG. 8B. The second format may include the regular short BSR format shown in FIG. 4 and the regular long BSR format shown in FIG. 5. When the second identifier is greater than 7, the communication apparatus determines the first format as the target BSR format. When the second identifier is less than or equal to 7, the communication apparatus determines the second format as the target BSR format.

In an implementation, the communication apparatus may determine a specific format of the first format or the second format based on a quantity of LCGs having buffered data and a quantity of padding bits.

For example, for a specific implementation in which the communication apparatus determines the specific format of the first format or the second format based on the quantity of LCGs having buffered data and the quantity of padding bits, refer to the related descriptions in Implementation 1 of step 901.

In this embodiment of this application, when the second identifier is greater than the first value, the first format is determined as the target BSR format. When the second identifier is less than or equal to the first value, the second format is determined as the target BSR format. While integrity of a reported LCG having buffered data is ensured, a quantity of bits required for reporting a BSR is reduced, and resource utilization is improved.

1002: Generate a BSR based on the target BSR format.

1003: Send the BSR to the network device.

For specific implementation of step 1002 and step 1003, refer to the specific descriptions of step 902 and step 903 in FIG. 9. Details are not described herein again.

In this embodiment of this application, one BSR format is determined as the target BSR format based on the LCG identifier of the LCG configured for the communication apparatus, and the BSR is reported in the target BSR format. The target BSR format is determined based on a configuration status of the communication apparatus, so that a format used by the communication apparatus to report the BSR matches configuration information of the communication apparatus, and the BSR can be properly reported.

FIG. 11 is a schematic flowchart of another communication method according to an embodiment of this application. As shown in FIG. 11, the communication method includes but is not limited to the following steps.

1101: Determine a target buffer status report BSR format based on a result of comparison between a quantity of LCGs configured for a communication apparatus and a first value.

For example, the first value may be specified in a protocol, or may be configured by a network device. The first value may be specifically 7.

The communication apparatus determines, from a plurality of BSR formats based on the result of comparison between the quantity of LCGs configured for the communication apparatus and the first value, the target BSR format used for reporting a BSR. There are at least two different BSR formats in the plurality of BSR formats, and quantities of LCGs that can be reported by using BSRs in the two BSR formats are different.

For example, the first value may be a quantity of LCGs that can be reported by using a BSR in one of the plurality of BSR formats. When the quantity of LCGs configured for the communication apparatus is less than or equal to the first value, the communication apparatus determines the BSR format as the target BSR format.

For example, the LCG of the communication apparatus is configured by the network device, and the network device configures a correspondence between an LCG and an LCH for the communication apparatus by using configuration information. The communication apparatus determines, based on the configuration information sent by the network device, a quantity of LCGs that can be used by the communication apparatus.

In an implementation, the determining a target buffer status report BSR format based on a result of comparison between a quantity of LCGs configured for the communication apparatus and a first value includes:

- when the quantity of LCGs configured for the communication apparatus is greater than the first value, determining a first format as the target BSR format; or
- when the quantity of LCGs configured for the communication apparatus is less than or equal to the first value, determining a second format as the target BSR format.

The plurality of BSR formats may include the first format and the second format. A quantity of LCGs that can be reported by using a BSR in the first format is different from a quantity of LCGs that can be reported by using a BSR in the second format. The quantity of LCGs that can be reported by using the BSR in the first format is a first quantity threshold, the quantity of LCGs that can be reported by using the BSR in the second format is a second quantity threshold, and the first quantity threshold is greater than the second quantity threshold. When the quantity of LCGs configured for the communication apparatus is greater than the second quantity threshold, buffer data volumes of the LCGs are reported by using the BSR in the second format, and consequently, buffer data volumes of some LCGs fail to be reported. To ensure that a buffer data volume of each LCG can be reported, when the quantity of LCGs configured for the communication apparatus is greater than the second quantity threshold, the BSR in the first format is used to report the buffer data volumes of the LCGs.

For example, the first quantity threshold may be 256, and the second quantity threshold may be 8. The first format may include the extended short BSR format shown in FIG. 6, the extended long BSR format shown in FIG. 7, and the medium BSR format shown in FIG. 8A or FIG. 8B. The second format may include the regular short BSR format shown in FIG. 4 and the regular long BSR format shown in FIG. 5. When the quantity of LCGs configured for the communication apparatus is greater than 8, the communication apparatus determines the first format as the target BSR format. When the quantity of LCGs configured for the communication apparatus is less than or equal to 8, the communication apparatus determines the second format as the target BSR format.

In an implementation, the communication apparatus may determine a specific format of the first format or the second format based on a quantity of LCGs having buffered data and a quantity of padding bits.

For example, for a specific implementation in which the communication apparatus determines the specific format of the first format or the second format based on the quantity of LCGs having buffered data and the quantity of padding bits, refer to the related descriptions in Implementation 1 of step 901.

In this embodiment of this application, when a same quantity of LCGs are reported, a quantity of bits of the BSR in the first format is greater than that of the BSR in the second format, and the BSR in the second format cannot report an LCG whose LCG identifier is greater than the first value. When the quantity of LCGs configured for the communication apparatus is greater than the first value, the first format is determined as the target BSR format. When the quantity of LCGs configured for the communication apparatus is less than or equal to the first value, the second format is determined as the target BSR format. While integrity of a reported LCG having buffered data is ensured, a quantity of bits required for reporting a BSR is reduced, and resource utilization is improved.

1102: Generate a BSR based on the target BSR format.

1103: Send the BSR to the network device.

For specific implementation of step 1102 and step 1103, refer to the specific descriptions of step 902 and step 903 in FIG. 9. Details are not described herein again.

In this embodiment of this application, one BSR format is determined as the target BSR format based on the quantity of LCGs configured for the communication apparatus, and the BSR is reported in the target BSR format. The target BSR format is determined based on a configuration status of the communication apparatus, so that a format used by the communication apparatus to report the BSR matches configuration information of the communication apparatus, and the BSR can be properly reported.

Figure 12:
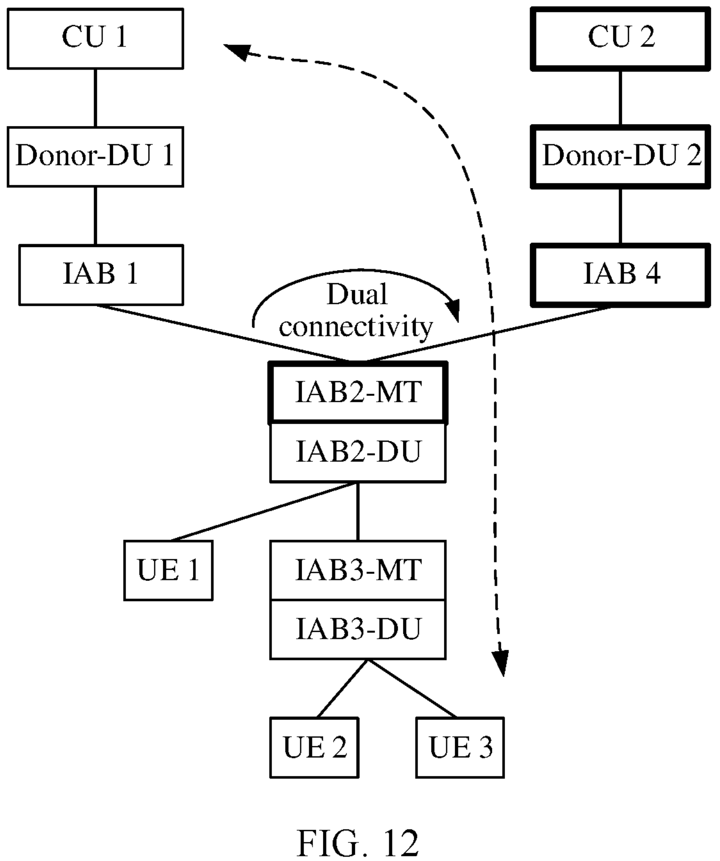
FIG. 12 is a schematic diagram of a structure of a BAP topology of an IAB network according to an embodiment of this application.

FIG. 12 is an example of a BAP topology of an IAB network according to an embodiment of this application. In this application, the BAP topology is a topology of a BAP layer. In FIG. 12, an IAB2-MT and an IAB2-DU are two parts included in an IAB node 2, and an IAB3-MT and an IAB-DU 3 are two parts included in an IAB node 3. As shown in FIG. 12, a topology in thin blocks represents a BAP topology 1 controlled by a Donor-CU1. For example, a BAP address of an IAB node located in the BAP topology 1 is allocated by the Donor-CU1. A topology in thick blocks represents a BAP topology 2 controlled by a Donor-CU2. For example, a BAP address of an IAB node located in the BAP topology 2 is allocated by the Donor-CU2. The BAP topology 1 includes an IAB node 1, the IAB node 2, and the IAB node 3, and the BAP topology 2 includes an IAB node 4. In FIG. 12, the MT of the IAB node 2, that is, the IAB-MT2, is connected to a Donor-DU 1 and a Donor-DU 2 through dual connectivity. An F1 interface of the IAB node 2 is terminated at the CU 1. That is, the CU 1 is an F1-termination node of the IAB node 2. For this BAP topology, a service of an IAB node or a service of UE connected to the IAB node may be transmitted by using several different types of nodes. These different types of nodes may include an IAB node (for example, the IAB node 4) managed by the CU 1 and an IAB node (for example, the IAB node 3) managed by the CU 2.

As shown in FIG. 12, the IAB node 2 may receive a data packet delivered by the CU 1 through the Donor-DU 1 and the IAB node 1 (refer to a path indicated by a solid arrow in FIG. 12), or may receive a data packet delivered by the CU 1 through the Donor-DU 2 and the IAB node 3 (refer to a path indicated by a dashed arrow in FIG. 12). The IAB node 2 is a boundary node in the IAB network shown in FIG. 12. Because the F1 interface of the IAB node 2 terminates at the CU 1 (the DU of the IAB node 2 terminates at the CU 1), a DU of a parent node (the IAB node 3) of the IAB node 2 terminates at the CU 2.

In a dual-connectivity scenario, there is a Uu interface between the IAB node 2 and a donor gNodeB 1 (a gNB1, including the CU 1 and the Donor-DU 1), and there is a Uu interface between the IAB node 2 and a donor gNodeB 2 (a gNB2, including the CU 2 and the Donor-DU 2). There is an F1 interface between the IAB node 2 and the donor gNodeB 1. F1 interface communication between the IAB node 2 and the donor gNodeB 1 may pass through the Donor-DU 1 or the Donor-DU 2. In other words, the donor gNodeB 1 may select the Donor-DU 1 and/or the Donor-DU 2 to perform F1 interface communication with the IAB node 2.

The dual-connectivity scenario may exist in a process in which the IAB node 2 performs cross-donor gNodeB handover, or may exist in a process in which the IAB node 2 performs secondary gNodeB addition. The IAB node 2 first establishes a connection to a first parent node (namely, the IAB 1), and then establishes a connection to a second parent node (namely, the IAB 4) through secondary gNodeB addition. The first parent node is connected to the CU 1, and the second parent node is connected to the CU 2. The DU part of the IAB node 2 is connected to the CU 1, but the MT part of the IAB node 2 is connected to both a cell served by the IAB node 1 (specifically, a DU part of the IAB node 1) and a cell served by the IAB node 4 (specifically, a DU part of the IAB node 4). A child node and subordinate UE of the IAB node 2 still maintain connection relationships with the CU 1. (That is, the Donor-DU 2 and the IAB node 4 in the thick blocks are currently managed or controlled by a target IAB donor, or belong to a network segment controlled by the CU 2, and the other thin blocks are managed or controlled by a source IAB donor node, or belong to a network segment controlled by the CU 1. Specially, because the IAB2-MT part may simultaneously maintain dual links to parent nodes controlled by two different donor nodes, the IAB2-MT may be considered as a node controlled or managed by the source IAB donor. For example, when communicating with the IAB node 1, the IAB2-MT may be considered as a node managed or controlled by the source IAB donor or belongs to a network segment controlled by the CU 1. In addition, it may also be considered that the IAB2-MT belongs to a network segment controlled by the target IAB donor. For example, on a path shown by the dashed line with double arrows, the IAB2-MT may also be considered as a node that is managed or controlled by the target IAB donor or belongs a network segment controlled by the CU 2 like other nodes in the thick blocks. Alternatively, in another possible manner, the IAB2-MT may be considered as a node controlled or managed by a donor node that maintains a radio resource control (RRC) connection of the IAB2-MT, or belongs to a network segment controlled by a donor node that maintains an RRC connection of the IAB2-MT. For example, if an RRC connection of the IAB2-MT is maintained between the IAB2-MT and the CU 1, the IAB2-MT may be considered as a node controlled or managed by the source IAB donor.) Therefore, a service of UE served by the IAB node 2 and a service of the IAB node 3 (including services of subordinate UE 2 and UE 3) may all be transmitted through the IAB node 2, the IAB node 4, and the Donor-DU 2 (refer to the path indicated by the dashed line with double arrows in the figure).

Figure 13:
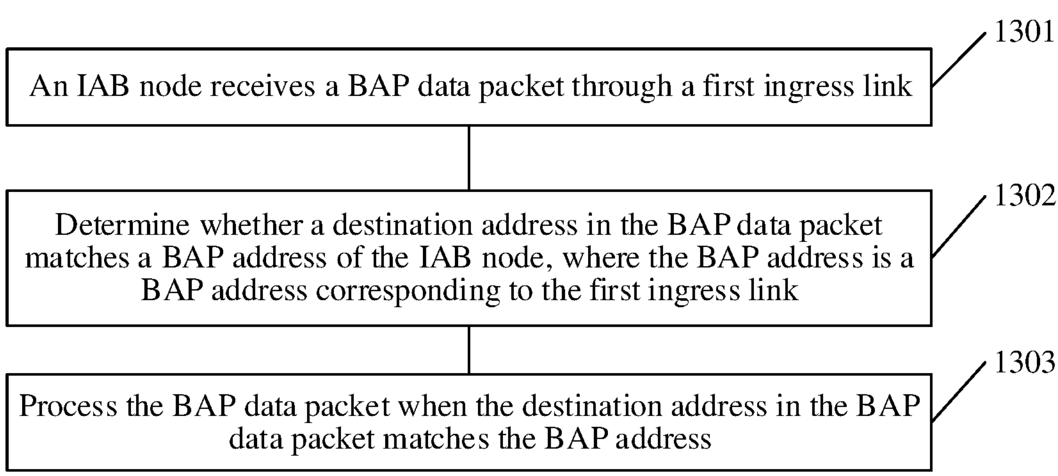
FIG. 13 is a schematic flowchart of another communication method according to an embodiment of this application.

FIG. 13 shows another communication method according to an embodiment of this application. The method is applied to a boundary node in an IAB network. The boundary node in the IAB network is located in a first BAP topology (for example, the BAP topology 1), and is also located in a second BAP topology (for example, the BAP topology 2). A boundary node in an IAB network may have the following feature: an IAB-donor-CU at which a DU of the boundary node terminates is different from an IAB-donor-CU at which a DU of at least one parent node terminates. A boundary IAB node may be defined as follows: IAB-node, whose IAB-DU is terminated to a different IAB-donor-CU than a parent DU. It is assumed that an IAB node in the IAB network has two parent nodes, a DU of the IAB node terminates at a CU of an IAB-donor 1, a DU of a parent node of the IAB node terminates at the CU of the IAB-donor 1, and a DU of another parent node of the IAB node terminates at a CU of an IAB-donor 2. In this case, the IAB node is a boundary node. The method includes the following steps.

1301: An IAB node receives a BAP data packet through a first ingress link.

For example, the IAB node is a boundary node of the IAB network. A receiving end of a BAP entity of the IAB node receives the BAP data packet through the first ingress link. The BAP data packet may be specifically a BAP data PDU.

For example, the first ingress link may be an ingress link, or may be an ingress channel. The first ingress link may correspond to a first ingress backhaul RLC channel (BH RLC CH).

1302: The IAB node determines whether a destination address in the BAP data packet matches a BAP address of the IAB node, where the BAP address of the IAB node is a BAP address corresponding to the first ingress link.

For example, the BAP address corresponding to the first ingress link may be understood as a BAP address configured by a base station corresponding to the first ingress link for the IAB node. For example, a plurality of BAP addresses may be configured for the IAB node. The IAB node may be connected to a plurality of BAP topologies, and each of a plurality of base stations that manage the plurality of BAP topologies allocates one BAP address to the IAB node. The IAB node receives, through the first ingress link, a BAP data packet sent by the first BAP topology. The first BAP topology is managed by a first base station. The IAB node parses the received BAP data packet to obtain the destination address in the BAP data packet, and compares the destination address with a BAP address configured by the first base station for the IAB node. If the destination address is the same as the BAP address configured by the first base station for the IAB node, it is determined that the destination address in the BAP data packet matches the BAP address of the IAB node. If the destination address is not the same as the BAP address configured by the first base station for the IAB node, it is determined that the destination address in the BAP data packet does not match the BAP address of the IAB node.

For example, the IAB node may be dual-connected to the first BAP topology and the second BAP topology. The first BAP topology is managed by the first base station (for example, a gNB1), and the second BAP topology is managed by a second base station (for example, a gNB2). The first ingress link is used to receive a BAP data packet sent from the first BAP topology, and a second ingress link is used to receive a data packet from the second BAP topology. For example, a BAP address configured by the gNB1 for the IAB node is X, and a BAP address configured by the gNB2 for the IAB node is Y When the IAB node receives the BAP data packet through the first ingress link, the IAB node compares the BAP address X configured by the gNB1 for the IAB node with the destination address in the BAP data packet, to determine whether the BAP address X matches the destination address in the BAP data packet. When the IAB node receives the BAP data packet through the second ingress link, the IAB node compares the BAP address Y configured by the gNB2 for the IAB node with the destination address in the BAP data packet, to determine whether the BAP address Y matches the destination address in the BAP data packet.

The IAB network shown in FIG. 12 may be an example of an IAB network to which the method in FIG. 13 is applicable. The first BAP topology corresponds to the BAP topology 1, the second BAP topology corresponds to the BAP topology 2, the gNB1 corresponds to the CU 1 and the Donor-DU 1, the gNB2 corresponds to the CU 2 and the Donor-DU 2, and the IAB node corresponds to the IAB node 2.

1303: Process the BAP data packet when the destination address in the BAP data packet matches the BAP address.

For example, the IAB node may remove a BAP header from the BAP data packet to obtain a BAP SDU, and deliver the BAP SDU to an upper layer of a BAP layer of the IAB node.

In this embodiment of this application, the IAB node receives the BAP data packet through the first ingress link, matches the destination address in the BAP data packet with the BAP address that is in the IAB node and that corresponds to the first ingress link, and processes the BAP data packet when the destination address in the BAP data packet matches the BAP address. This avoids a waste of resources caused by incorrectly processing of the BAP data packet.

Figure 14:
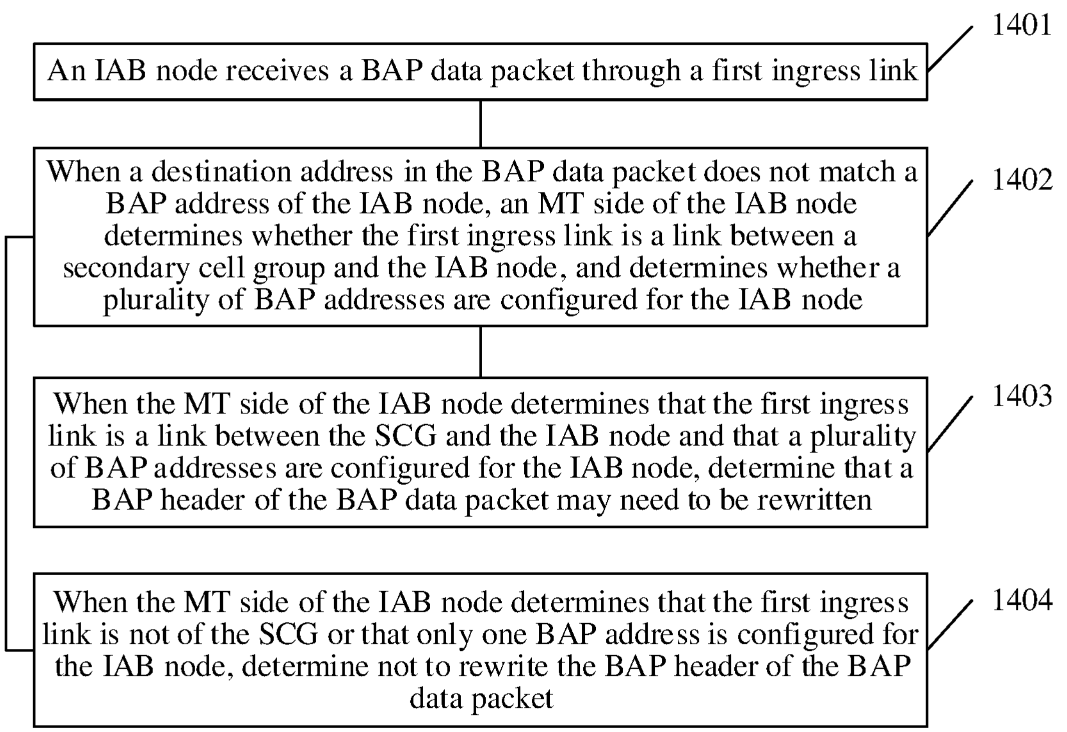
FIG. 14 is a schematic flowchart of another communication method according to an embodiment of this application.

FIG. 14 shows another communication method according to an embodiment of this application. As shown in FIG. 14, the communication method includes the following steps.

1401: An IAB node receives a BAP data packet through a first ingress link.

For specific implementation of step 1401, refer to the specific descriptions of step 1301 in FIG. 13. Details are not described herein again.

1402: When a destination address in the BAP data packet does not match a BAP address of the IAB node, an MT side of the IAB node determines whether the first ingress link is a link between a secondary cell group (SCG) and the IAB node, and determines whether a plurality of BAP addresses are configured for the IAB node.

After receiving the BAP data packet through the first ingress link, the IAB node compares the destination address in the BAP data packet with the BAP address of the IAB node, to determine whether the destination address matches the BAP address of the IAB node. When the destination address in the BAP data packet does not match the BAP address of the IAB node, it indicates that the BAP data packet is not sent to the IAB node, and the IAB node needs to route the BAP data packet to a correct path. For example, the MT side of the IAB node determines that a BAP header of the BAP data packet may need to be rewritten, to route the BAP data packet to the correct path. The MT side of the IAB node determines whether the first ingress link is a link between the SCG and the IAB node, or the MT side of the IAB node determines whether the first ingress link is a direct air interface radio link between an IAB node in the SCG and a secondary base station. When the MT side of the IAB node determines that the first ingress link is a link between the SCG and the IAB node, it indicates that the BAP is from the secondary base station. When the first ingress link is a link between the SCG and the IAB node, the MT side of the IAB node determines whether a plurality of BAP addresses are configured for the IAB node. When a plurality of BAP addresses are configured for the IAB node, it is determined that the BAP header of the BAP data packet may need to be rewritten.

For example, the IAB node may be dual-connected to a first BAP topology and a second BAP topology. The first BAP topology is managed by a first base station (for example, a gNB1), and the second BAP topology is managed by a second base station (for example, a gNB2). An ingress link 1 is used to receive a BAP data packet sent by the first BAP topology, and an ingress link 2 is used to receive a data packet sent by the second BAP topology. The gNB1 may be used as a role of a master base station of the IAB node, and the gNB2 may be used as a role of a secondary base station. The MT side of the IAB node determines that the first ingress link is a link between the SCG and the IAB node, and may determine that the BAP data packet is from the second BAP topology. If the IAB node is configured with two BAP addresses, the IAB node can be connected to two topologies. When the destination address in the BAP data packet does not match the BAP address of the IAB node, it indicates that the BAP data packet is not sent to the IAB node, and the IAB node needs to route the BAP data packet to a correct path. When the BAP data packet received by the IAB node is sent by the second BAP topology and is not sent to the IAB node, the IAB node needs to rewrite the BAP header of the BAP data packet and send the BAP data packet to a child node, so that the child node of the IAB node can identify the BAP data packet.

The IAB network shown in FIG. 12 may be an example of an IAB network to which the method in FIG. 14 is applicable. The first BAP topology corresponds to the BAP topology 1, the second BAP topology corresponds to the BAP topology 2, the gNB1 corresponds to the CU 1 and the Donor-DU 1, the gNB2 corresponds to the CU 2 and the Donor-DU 2, and the IAB node corresponds to the IAB node 2.

In some implementations, step 1402 may be replaced with: When the destination address in the BAP data packet does not match the BAP address of the IAB node, a DU side of the IAB node determines whether a plurality of BAP addresses are configured for the IAB node. When the DU side of the IAB node determines that a plurality of BAP addresses are configured for the IAB node, it is determined that the BAP header of the BAP data packet may need to be rewritten.

For example, when the destination address in the BAP data packet matches the BAP address of the IAB node, the BAP header of the BAP data packet is removed to obtain a BAP SDU, and the BAP SDU is delivered to an upper layer of a BAP layer.

1403: When the MT side of the IAB node determines that the first ingress link is a link between the SCG and the IAB node and that a plurality of BAP addresses are configured for the IAB node, determine that the BAP header of the BAP data packet may need to be rewritten.

The determining that the BAP header of the BAP data packet may need to be rewritten may also be understood as determining to perform a BAP header rewriting determining procedure.

In an implementation, the BAP header rewriting determining procedure may be: checking whether a first BAP route identifier of the BAP data packet matches a rewriting table, that is, determining whether the first BAP route identifier can be rewritten; and if the first BAP route identifier matches the rewriting table, rewriting the first BAP route identifier to a second BAP route identifier based on the rewriting table; or if the first BAP route identifier does not match the rewriting table, delivering the first data packet to the upper layer of the BAP node of the first IAB node. The rewriting table may include one or more groups of BAP route identifier mapping relationships. Each group of BAP route identifier mapping relationships is used to map a BAP route identifier that cannot be identified by the IAB node (namely, a BAP route identifier that can be identified by an IAB node in the second BAP topology) to a BAP route identifier that can be identified by the IAB node (namely, a BAP route identifier that can be identified by an IAB node in the first BAP topology). The checking whether the first BAP route identifier of the BAP data packet matches the rewriting table may be: checking whether the rewriting table includes a mapping relationship between the first BAP route identifier and another BAP route identifier. The rewriting the first BAP route identifier into the second BAP route identifier based on the rewriting table may be: obtaining, based on the rewriting table, the second BAP route identifier that has a BAP route identifier mapping relationship with the first BAP route identifier.

Table 3 is an example of the rewriting table provided in this application. Refer to Table 3. The first column is an original BAP route identifier, and the second column is a rewritten BAP route identifier. It should be understood that original BAP route identifiers in the first column are BAP route identifiers that can be identified by the IAB node in the second BAP topology. In other words, each original BAP route identifier in the first column corresponds to a BAP route identifier of a downlink data packet (for example, a BAP data packet) that belongs to the second BAP topology. The rewritten BAP route identifier in the second column is a BAP route identifier that can be identified by the IAB node. In Table 3, an original BAP route identifier in each row corresponds to a rewritten BAP route identifier in the row. For example, the first BAP route identifier in the first row corresponds to the second BAP route identifier in the first row. For example, the first BAP route identifier may be used to check whether the first column of Table 3 includes the first BAP route identifier. If yes, the first BAP route identifier matches the rewriting table; or if no, the first BAP route identifier does not match the rewriting table. In this example, if the first column in Table 3 includes the first BAP route identifier, the second BAP route identifier that has a mapping relationship with the first BAP route identifier is obtained.

TABLE 3

| Original BAP route identifier | Rewritten BAP route identifier |
|---|---|
| First BAP route identifier | Second BAP route identifier |
| Third BAP route identifier | Fourth BAP route identifier |
| . . . | . . . |
| $(N)^{th}$ BAP route identifier | $(N+1)^{th}$ BAP route identifier |

In some implementations, step 1403 may be replaced with: When the DU side of the IAB node determines that a plurality of BAP addresses are configured for the IAB node, determine that the BAP header of the BAP data packet may need to be rewritten. When a plurality of BAP addresses are configured for the IAB node, an ingress link for receiving BAP data by the IAB node and an egress link for sending the BAP data may not belong to a same BAP topology. Therefore, the BAP header of the BAP data packet may need to be rewritten. The determining that the BAP header of the BAP data packet may need to be rewritten may also be understood as determining to perform a BAP header rewriting determining procedure.

1404: When the MT side of the IAB node determines that the first ingress link is not of the SCG or that only one BAP address is configured for the IAB node, determine not to rewrite the BAP header of the BAP data packet.

When the MT side of the IAB node determines that the first ingress link is not of the SCG, it indicates that the BAP data packet is from a master base station, and it is determined that the BAP header of the BAP data packet does not need to be rewritten. When only one BAP address is configured for the IAB node, it indicates that the IAB node is connected to only one BAP topology, and it is determined that the BAP header of the BAP data packet does not need to be rewritten.

In this embodiment of this application, the MT side of the IAB node or the DU side of the IAB node may determine whether the BAP header of the BAP data packet needs to be rewritten, so that the BAP data packet received by the IAB node is routed to the correct path.

The methods in embodiments of this application are described in detail above. Apparatuses in embodiments of this application are provided below.

Figure 15:
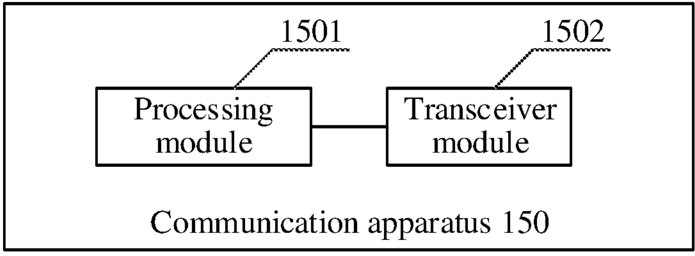
FIG. 15 is a schematic diagram of a structure of a communication apparatus according to an embodiment of this application.

FIG. 15 is a schematic diagram of a structure of a communication apparatus according to an embodiment of this application. The communication apparatus 150 may implement functions or steps of the foregoing method embodiments. The communication apparatus may include a processing module 1501 and a transceiver module 1502. Optionally, a storage unit may be further included. The storage unit may be configured to store instructions (code or a program) and/or data. The processing module 1501 and the transceiver module 1502 may be coupled to the storage unit. For example, the processing module 1501 may read the instructions (the code or the program) and/or the data in the storage unit, to implement a corresponding method. The foregoing units may be independently disposed, or may be partially or completely integrated. For example, the transceiver module 1502 may include a sending module and a receiving module.

The processing module 1501 is configured to support the communication apparatus in performing step 901, step 902, step 1001, step 1002, step 1101, and step 1102, and/or another process of the technology described in this specification.

The transceiver module 1502 is configured to support communication between the communication apparatus and another communication apparatus, for example, support access to the communication apparatus to perform step 903, step 1003, and step 1103, and/or another process of the technology described in this specification.

It should be noted that all related content of the steps in the foregoing method embodiments may be cited in function descriptions of corresponding functional modules. Details are not described herein again.

Figure 16:
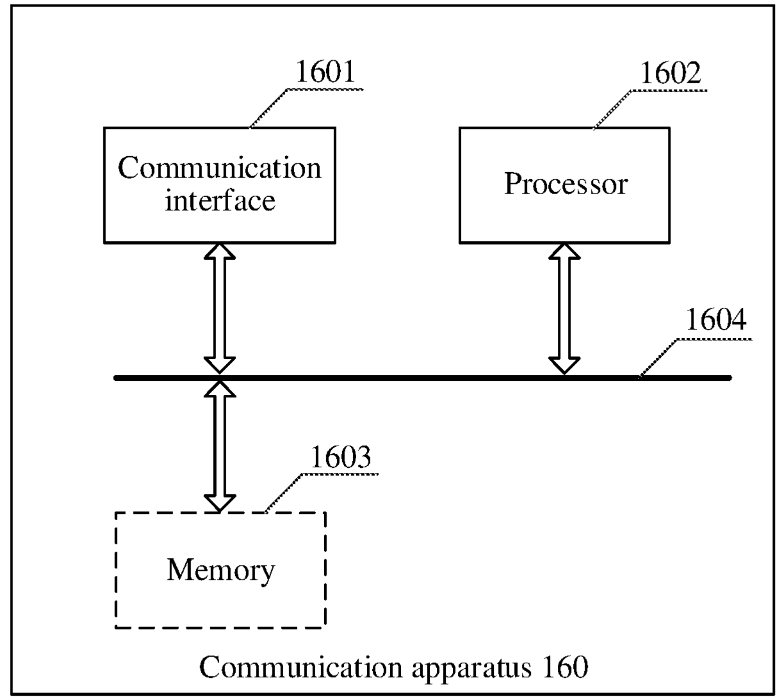
FIG. 16 is a schematic diagram of a structure of another communication apparatus according to an embodiment of this application.

FIG. 16 is a schematic diagram of a structure of another communication apparatus 160 according to an embodiment of this application. The communication apparatus 160 can implement the method provided in embodiments of this application. The communication apparatus 160 may be a chip system. In this embodiment of this application, the chip system may include a chip, or may include a chip and another discrete component.

In hardware implementation, the transceiver module 1502 may be a transceiver, and the transceiver is integrated into the communication apparatus 160 to form a communication interface 1601.

The communication apparatus 160 includes at least one processor 1602, configured to implement or support the communication apparatus 160 in implementing the methods provided in embodiments of this application. For details, refer to the detailed descriptions in the method example. Details are not described herein again.

The communication apparatus 160 may further include at least one memory 1603, configured to store program instructions and/or data. The memory 1603 is coupled to the processor 1602. The coupling in this embodiment of this application may be indirect coupling or a communication connection between apparatuses, units, or modules in an electrical form, a mechanical form, or another form, and is used for information exchange between the apparatuses, the units, or the modules. The processor 1602 may cooperate with the memory 1603. The processor 1602 may execute the program instructions and/or the data stored in the memory 1603, so that the communication apparatus 160 implements a corresponding method. At least one of the at least one memory may be included in the processor.

The communication apparatus 160 may further include the communication interface 1601, configured to communicate with another device through a transmission medium, so that an apparatus in the communication apparatus 160 can communicate with the another device. For example, when the communication apparatus 160 is an IAB node, the another device is another IAB node or a terminal device. The processor 1602 may receive and send data through the communication interface 1601. The communication interface 1601 may be specifically a transceiver.

A specific connection medium between the communication interface 1601, the processor 1602, and the memory 1603 is not limited in this embodiment of this application. In this embodiment of this application, the memory 1603, the processor 1602, and the communication interface 1601 are connected through a bus 1604 in FIG. 16, and the bus is represented by a thick line in FIG. 16. A connection manner between other components is only schematically described, and is not limited thereto. The bus may be classified into an address bus, a data bus, a control bus, and the like. For ease of description, the bus in FIG. 16 is represented by only one thick line, but which does not indicate that there is only one bus or one type of bus.

In embodiments of this application, the processor 1602 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory 1603 may be a non-volatile memory, for example, a hard disk drive (HDD) or a solid-state drive (SSD), or may be a volatile memory, for example, a random access memory (RAM). The memory is any other medium that can carry or store expected program code in a form of instructions or a data structure and that can be accessed by a computer, but is not limited thereto. The memory in embodiments of this application may alternatively be a circuit or any other apparatus that can implement a storage function, and is configured to store the program instructions and/or the data.

Figure 17:
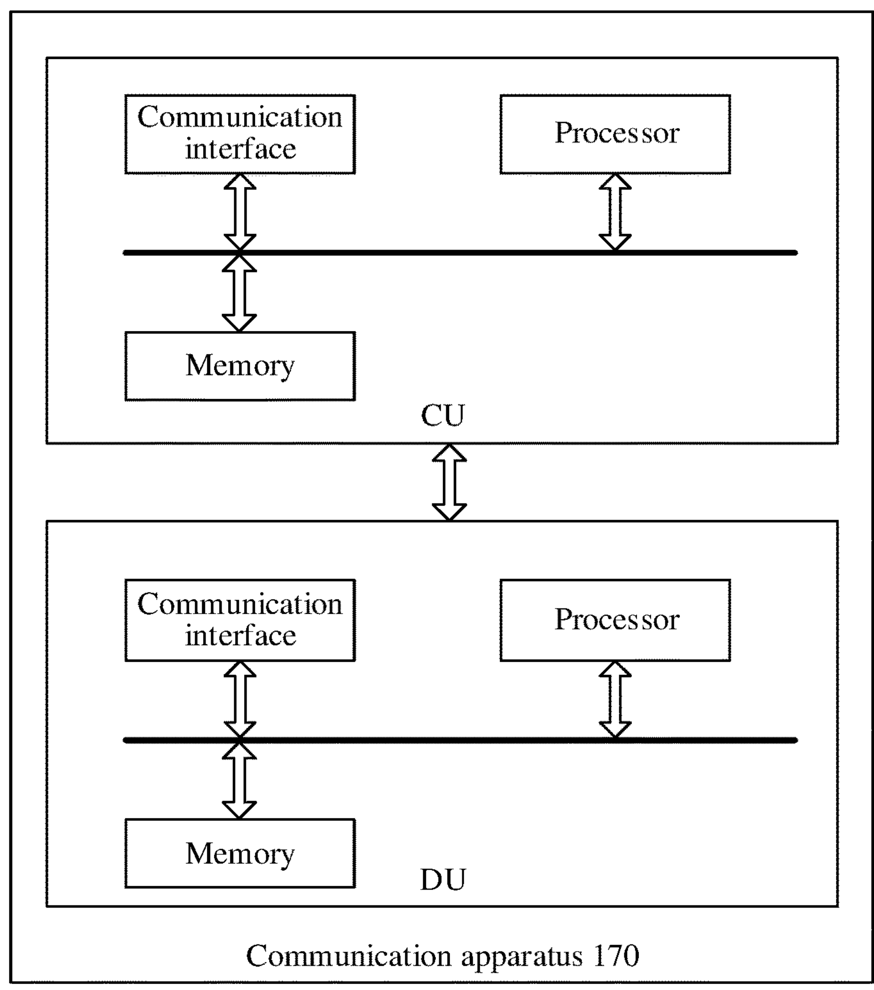
FIG. 17 is a schematic diagram of a structure of another communication apparatus according to an embodiment of this application.

It should be understood that when the communication apparatus 160 is an IAB node, FIG. 17 shows another form of the communication apparatus 160. In FIG. 17, the communication apparatus 170 is an IAB node. It should be understood that the IAB node includes a CU and a DU. The CU may include a communication interface, a processor, a memory, and a bus that connects the communication interface, the processor, and the memory. The communication interface may be configured to communicate with a CU of an IAB donor node or the DU of the IAB node. The DU may also include a communication interface, a processor, a memory, and a bus that connects the communication interface, the processor, and the memory. The communication interface is configured to communicate with an MT of the IAB node.

Figure 18:
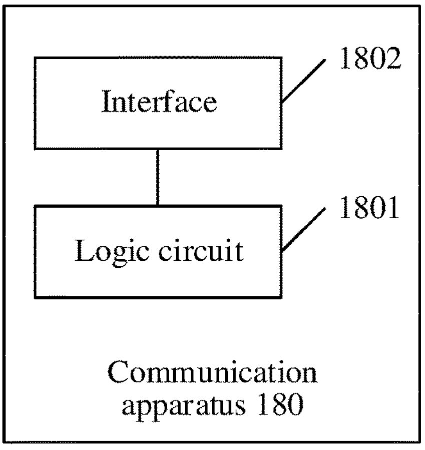
FIG. 18 is a schematic diagram of a structure of another communication apparatus according to an embodiment of this application.

FIG. 18 is a schematic diagram of a structure of another communication apparatus 180 according to an embodiment of this application. As shown in FIG. 18, the communication apparatus 180 shown in FIG. 18 includes a logic circuit 1801 and an interface 1802. The processing module in FIG. 15 may be implemented by using the logic circuit 1801, and the transceiver module in FIG. 15 may be implemented by using the interface 1802. The logic circuit 1801 may be a chip, a processing circuit, an integrated circuit, a system-on-chip (SoC), or the like, and the interface 1802 may be a communication interface, an input/output interface, or the like. In this embodiment of this application, the logic circuit and the interface may be further coupled to each other. A specific manner of connection between the logical circuit and the interface is not limited in this embodiment of this application.

In some embodiments of this application, the logic circuit and the interface may be configured to perform the methods shown in FIG. 9 to FIG. 11.

An embodiment of this application further provides a chip system. The chip system includes at least one processor, a memory, and an interface circuit. The memory, the transceiver, and the at least one processor are interconnected through a line. The at least one memory stores a computer program. When the computer program is executed by the processor, the method procedures shown in FIG. 9 to FIG. 11 are implemented.

An embodiment of this application further provides a computer-readable storage medium. The computer-readable storage medium stores a computer program. When the computer program is run on a communication apparatus, the method procedures shown in FIG. 9 to FIG. 11 are implemented.

An embodiment of this application further provides a computer program product. When the computer program product runs on a communication apparatus, the method procedures shown in FIG. 9 to FIG. 11 are implemented.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may understand that all or some of the procedures of the methods in the foregoing embodiments may be implemented by a computer program instructing related hardware. The computer program may be stored in a computer-readable storage medium. When the computer program is run, the procedures in the foregoing method embodiments are performed. The foregoing storage medium includes any medium that can store computer program code, such as a ROM, a random access memory RAM, a magnetic disk, or an optical disc.

What is claimed is:

1. A communication method, comprising:

determining a target buffer status report (BSR) format based on a result of comparison between a first identifier and a first value, wherein the first identifier is a largest logical channel group (LCG) identifier among LCG identifiers of LCGs having buffered data; and generating a BSR based on the target BSR format.

2. The method according to claim 1, wherein the determining the target BSR format based on the result of the comparison between the first identifier and the first value comprises:

based on the first identifier being greater than the first value, determining a first format as the target BSR format, wherein a BSR in the first format is used to report a buffer data volume of an LCG whose LCG identifier is within a first identifier threshold; and based on the first identifier being less than or equal to the first value, determining a second format as the target BSR format, wherein a BSR in the second format is used to report a buffer data volume of an LCG whose LCG identifier is within a second identifier threshold, and wherein the first identifier threshold is greater than the second identifier threshold.

3. The method according to claim 2, wherein;

based on a quantity of LCGs having buffered data being 1, the first format or the second format is a short BSR format; or based on the quantity of LCGs having buffered data being greater than 1 and less than a second value, the first format or the second format is a medium BSR format; and based on the quantity of LCGs having buffered data being greater than or equal to the second value, the first format or the second format is a long BSR format.

4. The method according to claim 3, wherein a BSR in the long BSR format comprises a first bitmap, and each bit in the first bitmap indicates whether each of at least one LCG has buffered data or indicates whether a buffer size (BS) field corresponding to each of the at least one LCG exists.

5. The method according to claim 3, wherein a BSR in the medium BSR format comprises an LCG identifier of at least one LCG and indication information that indicates a buffer data volume of the at least one LCG.

6. The method according to claim 3, wherein a BSR in the short BSR format comprises an LCG identifier of a first LCG and indication information that indicates a buffer data volume of the first LCG.

7. The method according to claim 1, wherein the determining the target BSR format based on the result of the comparison between the first identifier and the first value comprises:

determining the target BSR format based on the result of the comparison between the first identifier and the first value and a result of comparison between a quantity of padding bits and a third value.

8. The method according to claim 7, wherein the determining the target BSR format based on the result of the comparison between the first identifier and the first value and the result of the comparison between the quantity of padding bits and the third value comprises:

based on the first identifier being greater than the first value and the quantity of padding bits being greater than or equal to the third value, determining a first format as the target BSR format;

based on the first identifier being greater than the first value and the quantity of padding bits being less than the third value, determining a second format as the target BSR format, wherein a BSR in the second format is used to report a buffer data volume of an LCG whose LCG identifier is less than the first value in the LCGs having buffered data; and based on the first identifier being less than or equal to the first value, determining the second format as the target BSR format.

9. The method according to claim 8, wherein:

based on the quantity of padding bits being equal to the third value, the first format is a short BSR format;

based on the quantity of padding bits being greater than the third value and less than a fourth value, the first format is a medium BSR format; and based on the quantity of padding bits being greater than or equal to the fourth value, the first format is a long BSR format.

10. The method according to claim 7, wherein the third value is determined based on a size of a BSR in the first format and a size of a media access control (MAC) subheader of the BSR in the first format.

11. A communication apparatus, comprising at least one processor coupled to one or more memories storing programming instructions for execution by the at least one processor to perform operations comprising:

determining a target buffer status report (BSR) format based on a result of comparison between a first identifier and a first value, wherein the first identifier is a largest logical channel group (LCG) identifier among LCG identifiers of LCGs having buffered data;

generating a BSR based on the target BSR format; and sending the BSR to a network device.

12. The apparatus according to claim 11, wherein the operations comprise:

based on the first identifier being greater than the first value, determining a first format as the target BSR format, wherein a BSR in the first format is used to report a buffer data volume of an LCG whose LCG identifier is within a first identifier threshold; and based on the first identifier being less than or equal to the first value, determining a second format as the target BSR format, wherein a BSR in the second format is used to report a buffer data volume of an LCG whose LCG identifier is within a second identifier threshold, and wherein the first identifier threshold is greater than the second identifier threshold.

13. The apparatus according to claim 12, wherein;

based on a quantity of LCGs having buffered data being 1, the first format or the second format is a short BSR format;

based on the quantity of LCGs having buffered data being greater than 1 and less than a second value, the first format or the second format is a medium BSR format; and based on the quantity of LCGs having buffered data being greater than or equal to the second value, the first format or the second format is a long BSR format.

14. The apparatus according to claim 13, wherein a BSR in the long BSR format comprises a first bitmap, and each bit in the first bitmap indicates whether each of at least one LCG has buffered data or indicates whether a buffer size (BS) field corresponding to each of the at least one LCG exists.

15. The apparatus according to claim 13, wherein a BSR in the medium BSR format comprises an LCG identifier of at least one LCG and indication information that indicates a buffer data volume of the at least one LCG.

16. The apparatus according to claim 13, wherein a BSR in the short BSR format comprises an LCG identifier of a first LCG and indication information that indicates a buffer data volume of the first LCG.

17. The apparatus according to claim 11, wherein the operations further comprise:

determining the target BSR format based on the result of the comparison between the first identifier and the first value and a result of comparison between a quantity of padding bits and a third value.

18. The apparatus according to claim 17, wherein the operations further comprise:

based on the first identifier being greater than the first value and the quantity of padding bits being greater than or equal to the third value, determining a first format as the target BSR format;

based on the first identifier being greater than the first value and the quantity of padding bits is less than the third value, determining a second format as the target BSR format, wherein a BSR in the second format is used to report a buffer data volume of an LCG whose LCG identifier is less than the first value in the LCGs having buffered data; and based on the first identifier being less than or equal to the first value, determining the second format as the target BSR format.

19. The apparatus according to claim 18, wherein:

based on the quantity of padding bits being equal to the third value, the first format is a short BSR format;

based on the quantity of padding bits being greater than the third value and less than a fourth value, the first format is a medium BSR format; and based on the quantity of padding bits being greater than or equal to the fourth value, the first format is a long BSR format.

20. The apparatus according to claim 17, wherein the third value is determined based on a size of a BSR in the first format and a size of a media access control (MAC) sub-header of the BSR in the first format.

* * * * *